(12) United States Patent
Ozdemir et al.

(10) Patent No.: US 7,676,327 B2
(45) Date of Patent: Mar. 9, 2010

(54) METHOD FOR OPTIMAL WAVE FIELD SEPARATION

(75) Inventors: Ahmet Kemal Ozdemir, Asker (NO); Ali Ozbek, Milton (GB)

(73) Assignee: WesternGeco L.L.C., Houston, TX (US)

( * ) Notice: Subject to any disclaimer, the term of this patent is extended or adjusted under 35 U.S.C. 154(b) by 292 days.

(21) Appl. No.: 11/740,641

(22) Filed: Apr. 26, 2007

(65) Prior Publication Data

US 2008/0275649 A1 Nov. 6, 2008

(51) Int. Cl.
*G06F 15/00* (2006.01)
(52) U.S. Cl. .......................................... 702/17; 702/14
(58) Field of Classification Search .................... 367/21, 367/14, 15, 24, 124; 702/13, 14, 17
See application file for complete search history.

(56) References Cited

U.S. PATENT DOCUMENTS

| | | | |
|---|---|---|---|
| 2,407,680 | A | 7/1946 | Palmquist |
| 3,190,178 | A | 6/1965 | McKenzie |
| 3,283,293 | A | 11/1966 | Pavey, Jr. et al. |
| 3,417,959 | A | 12/1968 | Schultz |
| 3,585,415 | A | 6/1971 | Muller et al. |
| 3,922,065 | A | 11/1975 | Schultz |
| 3,935,365 | A | 1/1976 | Eigenmann |
| 4,075,049 | A | 2/1978 | Wood |
| 4,182,548 | A | 1/1980 | Searight et al. |
| 4,332,437 | A | 6/1982 | Searight et al. |
| 4,367,857 | A | 1/1983 | McCarthy |
| 4,486,865 | A | 12/1984 | Ruehle |
| 4,511,210 | A | 4/1985 | Tung et al. |
| 4,569,920 | A | 2/1986 | Smith-Johannsen |
| 4,626,127 | A | 12/1986 | May |
| 4,896,943 | A | 1/1990 | Tollicer et al. |
| 4,897,136 | A | 1/1990 | Bailey et al. |
| 4,935,903 | A | 6/1990 | Sanders et al. |
| 5,064,272 | A | 11/1991 | Bailey et al. |
| 5,066,098 | A | 11/1991 | Kult et al. |
| 5,146,287 | A | 9/1992 | Carder |

(Continued)

FOREIGN PATENT DOCUMENTS

| | | |
|---|---|---|
| GB | 2 363 459 | 12/2001 |
| WO | WO 98/28636 | 7/1998 |
| WO | WO 00/20895 | 4/2000 |
| WO | WO2004/081583 | 9/2004 |

OTHER PUBLICATIONS cmapsystem.com/uwlasers.htm, Apr. 9, 2007.*

(Continued)

*Primary Examiner*—Edward R Cosimano
*Assistant Examiner*—Douglas N Washburn
(74) *Attorney, Agent, or Firm*—Jeffrey A. Pyle; Liangang (Mark) Ye; Jeffrey E. Griffin

(57) ABSTRACT

A technique for decomposing a recorded wave field represented in a set of multicomponent, marine seismic data centers around a computer-implemented method including: estimating the statistics of the noise terms in each one of a predetermined group of seismic measurements in a seismic data set acquired in a marine survey; modeling the physical propagation of a recorded wave field represented in the seismic data set from the estimated statistics; and estimating a directional component of the recorded wave field from the physical propagation model that minimizes error relative to the seismic measurements.

40 Claims, 11 Drawing Sheets

U.S. PATENT DOCUMENTS

| | | | |
|---|---|---|---|
| 5,270,780 A | | 12/1993 | Moran et al. |
| 5,583,825 A | * | 12/1996 | Carrazzone et al. ........... 367/31 |
| 5,621,700 A | | 4/1997 | Moldoveanu |
| 5,723,790 A | | 3/1998 | Andersson |
| 5,971,095 A | * | 10/1999 | Ozbek ....................... 181/112 |
| 6,097,424 A | | 8/2000 | Zernov et al. |
| 6,115,511 A | | 9/2000 | Sakai et al. |
| 6,366,533 B1 | | 4/2002 | English |
| 6,420,976 B1 | | 7/2002 | Baggs et al. |
| 6,476,853 B1 | | 11/2002 | Zernov et al. |
| 6,512,887 B2 | | 1/2003 | Inoue et al. |
| 6,552,965 B2 | | 4/2003 | Brandt et al. |
| 6,707,761 B2 | | 3/2004 | Erikson |
| 6,946,618 B2 | | 9/2005 | Tamura et al. |
| 6,970,578 B1 | | 11/2005 | Strand |
| 6,987,527 B2 | | 1/2006 | Kossin |
| 7,123,543 B2 | * | 10/2006 | Vaage et al. ................... 367/24 |
| 2004/0042341 A1 | | 3/2004 | Tenghamn et al. |
| 2005/0018537 A1 | | 1/2005 | Welker et al. |
| 2005/0160814 A1 | | 7/2005 | Vaganov et al. |
| 2005/0194201 A1 | | 9/2005 | Tenghamn et al. |
| 2005/0202585 A1 | | 9/2005 | Eskridge |
| 2006/0190181 A1 | | 8/2006 | Deffenbaugh et al. ......... 702/14 |

OTHER PUBLICATIONS agoenvironmental.com/CamLight.htm, Apr. 5, 2007.*
hboep.com/laser.html, Aug. 15, 2006.*
wetpixel.com/i.php/full/charles-mazel-on-ultraviolet-photography, Feb. 16, 2006.*
neo.no/, Feb. 6, 2007.*
qualisys.se/, Feb. 16, 2007.*
Amundsen et al., "Rough-sea deghosting of streamer seismic data using pressure gradient approximations," *Geophysics*, 70(1):V1-V9, 2005.
Amundsen, "Wavenumber-based filtering of marine point-source data," *Geophysics*, 58(9):1335-1348, 1993.
http://www.drdc-rddc.gc.ca/newsevents/newstand/release/050908_e.asp.
Ziolkowski et al., "The signature of an air gun array: computation from near-field measurements including interactions," *Geophysics*, 47(10):1413-1421, 1982.

* cited by examiner

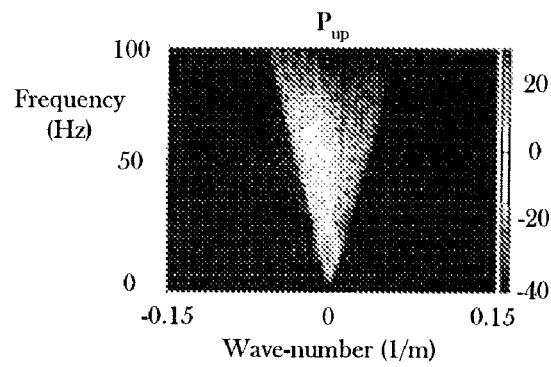
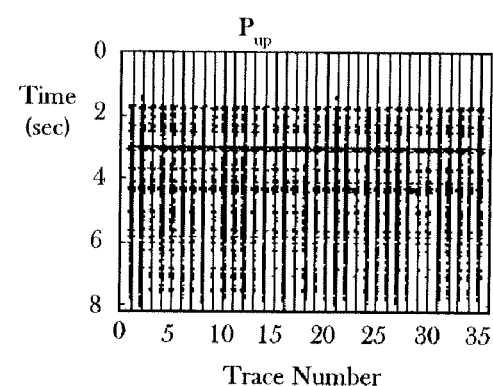
FIG. 11A  FIG. 11B
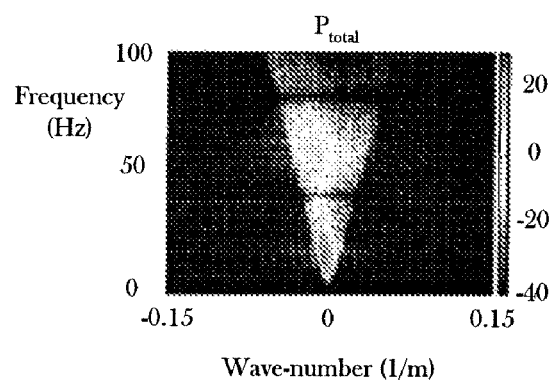
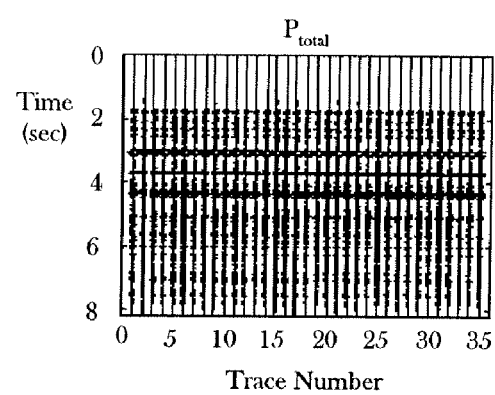
FIG. 12A  FIG. 12B
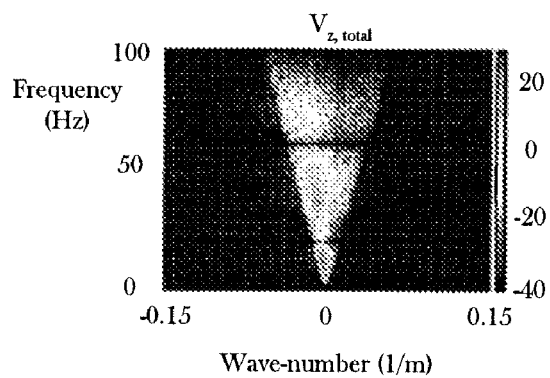
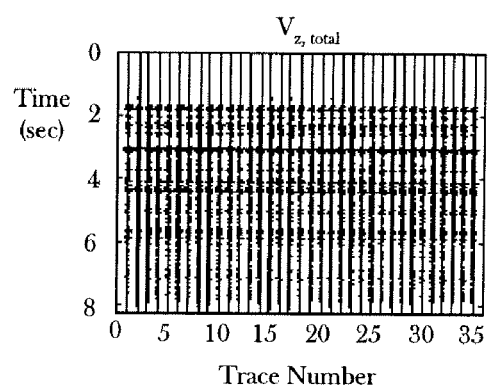
FIG. 13A  FIG. 13B

METHOD FOR OPTIMAL WAVE FIELD SEPARATION

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention disclosure relates to the processing of marine seismic data, and in particular, to wave field decomposition in marine seismic data.

This section of this document is intended to introduce various aspects of art that may be related to various aspects of the present invention described and/or claimed below. This section provides background information to facilitate a better understanding of the various aspects of the present invention. It should be understood that the statements in this section of this document are to be read in this light, and not as admissions of prior art.

Seismic exploration is widely used to locate and/or survey subterranean geological formations for hydrocarbon deposits. In a typical marine seismic survey, one or more marine seismic streamers are towed behind a survey vessel. The seismic streamers may be several thousand meters long and contain a large number of sensors, which are distributed along the length of the each seismic streamer cable. The survey vessel also includes one or more seismic sources, such as airguns and the like.

As the streamers are towed behind the survey vessel, acoustic signals, commonly referred to as "shots," produced by the seismic source are directed down through the water column into strata, beneath a water bottom surface, where they are reflected from the various subterranean geological formations travel back to sea surface (up-going wave). One well known problem in marine seismic is that, up-going waves are reflected once more at the sea surface because of the air-water interface. Hence the sensors in the seismic streamer cable record not only the desired wave field (up-going wave, i.e., reflected signal from various subterranean geological formations) but also their reflections from the sea surface (down-going wave) because of the air-water interface. This undesired term is known as "ghost" in the art. Depending on the incidence angle of the up-going wave field and depth of the streamer cable, the interference between the up-going and down-going wave fields create nulls or notches in the recorded spectrum. These notches reduce the useful bandwidth of the spectrum and limits the possibility of towing the streamer in deep water (e.g., at 20 m).

The process of decomposing the recorded wave field into up-and down-going components is known as wave field separation or deghosting in the literature. It is known that, to this purpose, particle velocity sensors can be incorporated into the streamer in addition to the pressure sensors. Then by combining the pressure and particle velocity measurements, the "ghost" free data, known as up-going wave field can be calculated. In the case of vertical incidence, the standard method to do the wave field separation is to add and subtract a scaled version of the vertical component of the particle velocity measurement to and from pressure measurement. This standard technique is known as PZ-summation in the literature.

There exist several methods which attempt to solve the wave field separation problem. The major problem with existing techniques of combining pressure and particle velocity measurements is that they do not exploit the statistics of the measurement noises to achieve optimal wave field separation. For instance some methods ignore the data from particle motion sensors at low frequencies (e.g., frequencies below 20 Hz) arguing that they are too noisy. Then they do single streamer deghosting using only pressure measurements at these frequencies. At higher frequencies, they do the standard PZ-summation.

In this invention, we solve the optimal wave field separation problem when a vector of measurements is obtained by using a towed streamer. Depending on the set of available data the method solves both 1-D, 2-D and 3-D wave field separation problem.

The present invention is directed to overcoming, or at least reducing the effects of, one or more of the problems set forth above.

BRIEF SUMMARY OF THE INVENTION

The present invention, in its various aspects and embodiments, presents a technique for decomposing a recorded wave field represented in a set of multicomponent, marine seismic data. The technique centers around a computer-implemented method comprising: estimating the statistics of the noise terms in each one of a predetermined group of seismic measurements in a seismic data set acquired in a marine survey; modeling the physical propagation of a recorded wave field represented in the seismic data set from the estimated statistics; and estimating a directional component of the recorded wave field from the physical propagation model that minimizes error relative to the seismic measurements.

The above presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

BRIEF DESCRIPTION OF THE SEVERAL VIEWS OF THE DRAWINGS

The invention will hereafter be described with reference to the accompanying drawings, wherein like reference numerals denote like elements, and:

FIG. 11A-FIG. 11B, FIG. 12A-FIG. 12B, and FIG. 13A-FIG. 13B illustrate selected characteristics of a synthetic recorded wave field used to test the efficacy of the present invention;

Figure 1:
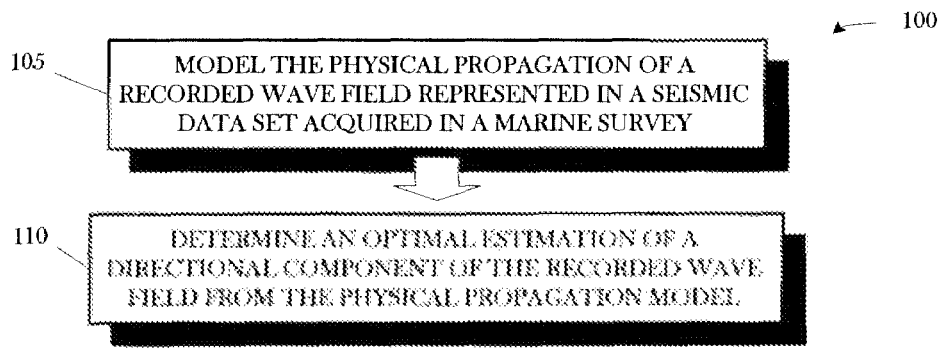
FIG. 1-FIG. 3 illustrate a method and an apparatus of one particular embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the scope of the invention as defined by the appended claims.

DETAILED DESCRIPTION OF THE INVENTION

One or more specific embodiments of the present invention will be described below. It is specifically intended that the present invention not be limited to the embodiments and illustrations contained herein, but include modified forms of those embodiments including portions of the embodiments and combinations of elements of different embodiments as come within the scope of the following claims. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the present invention unless explicitly indicated as being "critical" or "essential."

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

The present invention presents a method and apparatus implementing a technique to obtain an optimal wave field separation when a vector of measurements is obtained by using a towed streamer. For instance, the measurements may include pressure and particle velocity (or acceleration) data for the wave field. Alternatively, the measurements may include pressure measurements at two or more streamer depths. Depending on the set of available data, the technique can be applied to 1-D, 2-D or 3-D wave field separation problems, as will be discussed further below.

Figure 2:
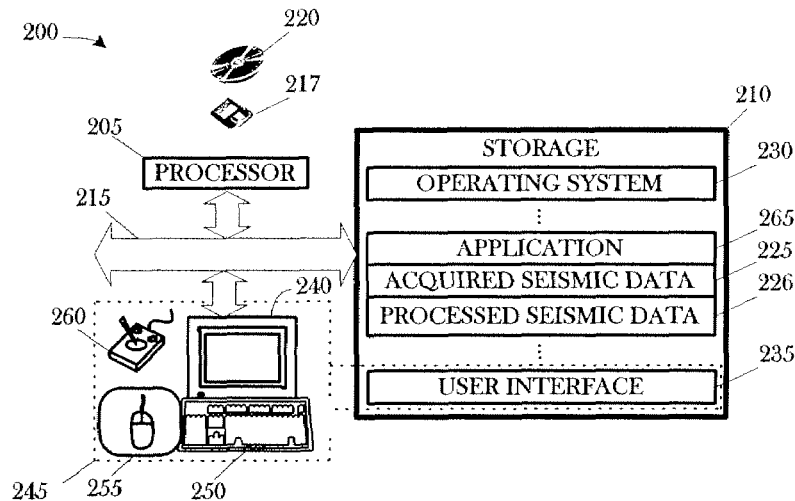
Figure 3:
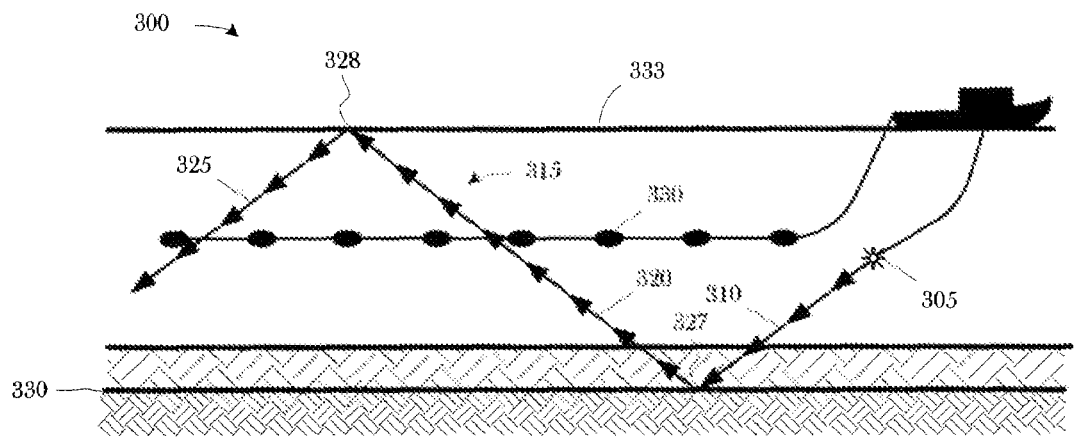

Referring now to the drawings wherein like reference numbers correspond to similar components throughout the several views and, specifically, referring to FIG. 1-FIG. 3, one particular embodiment of the present invention is disclosed. FIG. 1 presents a computer-implemented method 100 that may be performed on an apparatus such as the computing apparatus 200 of FIG. 2 to process data acquired in a towed-array marine survey such as the survey 300 in FIG. 3.

Turning now to FIG. 2, it shows selected portions of the hardware and software architecture of a computing apparatus 200 such as may be employed in some aspects of the present invention. The computing apparatus 200 includes a processor 205 communicating with storage 210 over a bus system 215. The storage 210 may include practically any type of medium, including a hard disk and/or random access memory ("RAM") and/or removable storage such as a floppy magnetic disk 217 and an optical disk 220.

The storage 210 is encoded with the acquired seismic data 225. The acquired seismic data 225 may have been previously acquired in any suitable manner known to the art. In general, the acquired seismic data 225 is acquired in a marine survey 300, shown in FIG. 3, in which a source 305 imparts an acoustic seismic signal 310 into the environment and whose reflections result in a wave field 315 comprised of an up-going component 320 and a down-going component 325. The up-going component 320 and the down-going component 325 are defined by reflection events 327, 328 at a subterranean reflector 330 and the sea surface 333, respectively.

As those in the art will appreciate, this process is iterated periodically over time. Also, the acoustic seismic signal 305 may be reflected many times. For example, an individual acoustic seismic signal 310 may be reflected at the seabed 336, at multiple subterranean reflectors 330, and the sea surface 333. Thus, at any given time, the wave field 315 may comprise several up-going and down-going components 320, 325 resulting from multiple seismic signals 310.

The wave field 315 is sensed by a plurality of sensors 330, only one indicated, which then outputs data representative of the wave field 315. As those in the art having the benefit of this disclosure will appreciate, and as will be discussed further below, the nature of the sensors 330 will be implementation specific and will determine the nature of the data collected. This data is representative of the recorded wave field 315 and the wave filed 315 can be said to be represented therein. The data output by the sensors 330 is then stored as the acquired seismic data 225 to record the wave field 315.

Note that the acquired seismic data 225 is digital at the time it is stored on the storage 210. In the particular embodiment disclosed below, the acquired seismic data 225 is digital at the point of acquisition. However, the point of digitization may vary depending on the implementation. The data may therefore be digital upon output from the sensors (not shown) by which it is acquired or upon conversion after output and prior to storage.

The acquired seismic data 225 may be stored using any suitable data structure known to the art. The data structure will typically be, for example, a flat file or a text delimited file. However, acceptable alternatives include structures such as a database, a list, a tree, a table, etc. The invention is not limited by the manner in which the acquired seismic data 225 is stored.

The storage 210 is also encoded with an operating system 230, user interface software 235, and an application 265. The user interface software 235, in conjunction with a display 230, implements a user interface 245. The user interface 245 may include peripheral I/O devices such as a keypad or keyboard 250, a mouse 255, or a joystick 260. The processor 205 runs under the control of the operating system 230, which may be practically any operating system known to the art. The application 265, when invoked, performs the method of the present invention, e.g., the method 100 of FIG. 1. The user may invoke the application in conventional fashion through the user interface 245.

Returning to FIG. 1, the method 100 is a computer-implemented method for processing a marine multicomponent seismic data set representing a recorded wave field. In the illustrated embodiment, the method 100 is performed by the execution of the application 265 by the processor 205 under the control of the OS 230, all shown in FIG. 2 and discussed above. Note, however, that the invention is not limited by the nature of the software component by which the method is implemented. In alternative embodiments, for example, the method 100 may be implemented in, e.g., a utility or some other kind of software component.

Referring now to FIG. 1-FIG. 3, collectively, the method 100, as executed by the computing apparatus 200, begins by modeling (at 105) the physical propagation of a recorded wave field 315, shown in FIG. 3, represented in a seismic data set 225 acquired in a marine survey 300. The illustrated marine survey 300 is a towed-array survey, but the invention may be applied to data acquired in other types of marine surveys as will be described more fully below. The method 100 then determines (at 110) an optimal estimation of a directional component of the recorded wave field 315 from the physical propagation model. The directional component may be, for example, either the upgoing component 320 or the downgoing component 325 of the recorded wavefield 315.

The estimation is "optimal" in two senses. First, it employs all the seismic measurements that are acquired and comprise a portion of the seismic data set 225. Thus, for example, measurements are not excluded on the basis of assumptions found in the prior art—e.g., some measurement are too noisy. This does not mean that it employs all of the data collected during the survey 300. Many such surveys will collect data that is not seismic data. For instance, many surveys will include positioning sensors in the towed array 336 to help maintain the individual streamers 339 in the desires positions during the survey. The notion of an "optimal" estimation does not encompass the use of such data that does not represent the recorded wave field 315. Second, the determined estimation minimizes the fit error between itself and the actual measurements and estimated measurement calculated by using the physical propagation model.

Note that the physical modeling (at 105) employed by the method may use any suitable modeling technique known to the art. Many such techniques are known, and suitable techniques are disclosed in Lasse Amundsen, "Wavenumber-based Filtering of Marine Point-Source Data", 58 *Geophysics* 1335 (1993), and Lasse Amundsen et al., "On Rough-Sea Deghosting of Single Streamer Seismic Data Using Pressure Gradient Approximations", 70 Geopysics 1 (2005). These references are hereby incorporated by reference as if expressly set forth verbatim herein. Note also that the method 100 assumes that the deterministic parameters needed for the modeling are already known. These deterministic parameters may include streamer depth, acoustic speed of sound in water and the reflection coefficient of the sea surface. If they are not, then they may be obtained in any suitable manner known to the art. The techniques for obtaining such parameters and for physically modeling the propagation are well known to the art. Accordingly, for the sake of clarity and so as not to obscure the present invention, further discussion of these matters will be omitted.

Figure 4:
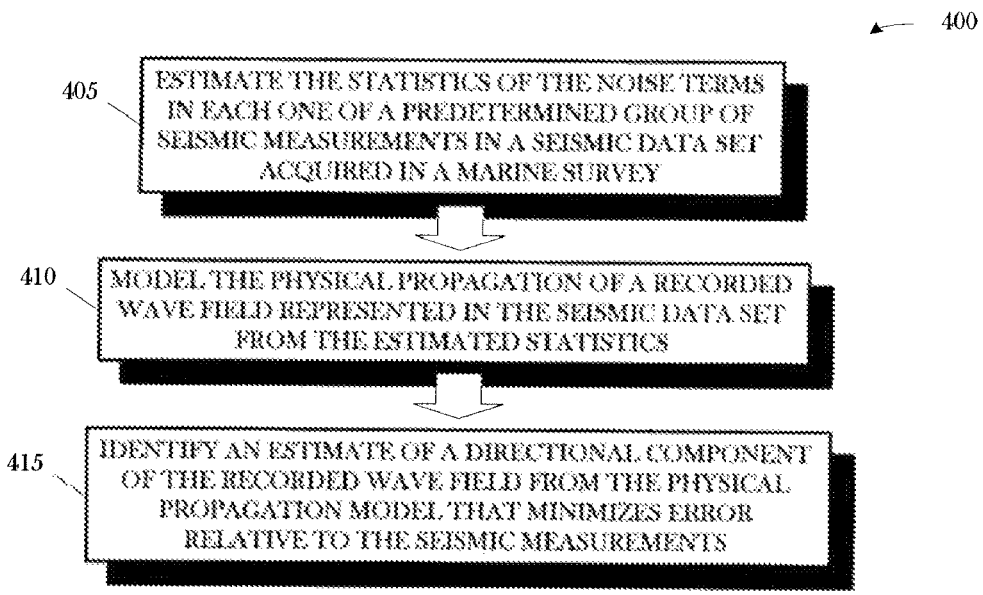
FIG. 4-FIG. 5 illustrate one particular implementation of the embodiment of FIG. 1-FIG. 3.
Figure 5:
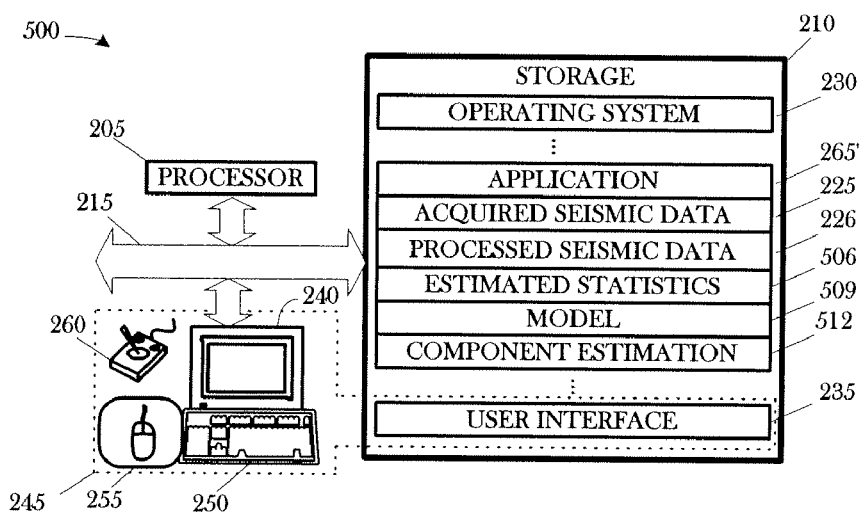

FIG. 4 and FIG. 5 illustrate a method 400 and a computing apparatus 500 that comprise one particular embodiment the technique shown in FIG. 1 and FIG. 2. In the method 400, the statistics of the noise in the seismic data set 225 are estimated (at 405). Such statistics may include, but are not limited to, noise levels and noise correlation, for example. More particularly, these quantities are estimated in each one of a predetermined group of seismic measurements in the seismic data set 225. As mentioned above, the composition of this group will be implementation specific depending on the nature of the survey. Thus, in a multicomponent survey, it will include both pressure and particle motion data where other types of surveys might only collect pressure data. Within the seismic data measurements that are collected, however, all the measurements are used.

The method 400 then models (at 410) the physical propagation of a recorded wave field 315, shown in FIG. 3, represented in the seismic data set 225 from the estimated statistics 506. In the illustrated embodiment, the estimated statistics are the estimated correlations of the noise. Finally, the method 400 identifies an estimate 512 of a directional component of the recorded wave field 315 from the physical propagation model 509 that minimizes error relative to the seismic measurements.

The method 400 is performed by the execution of the application 265', and results in the creation of the estimated statistics 506, physical propagation model 509, and the estimated component 512. Thus, this information comprises the processed seismic data 226 shown collectively in FIG. 2. The information may be stored in some form of data structure in a manner in which it survives the execution of the method 400 and may be stored long term or archived. Or, they may only be temporarily stored, or buffered, for the duration of the execution of the application 265'. Either way, its creation and storage works a physical transformation of the storage 210 since there was no such information on the storage 210 prior to execution of the application 265'.

The physical propagation model 509 may also find uses other than estimating the up-going component 320 once the up-going component 320 has been estimated. For example, it may be used to estimate other propagation characteristics of the recorded wave field 315. Exemplary characteristics include, but are not limited to down-going pressure, up-and down-going particle velocities. Still other characteristics may become apparent to those skilled in the art.

Figure 6:
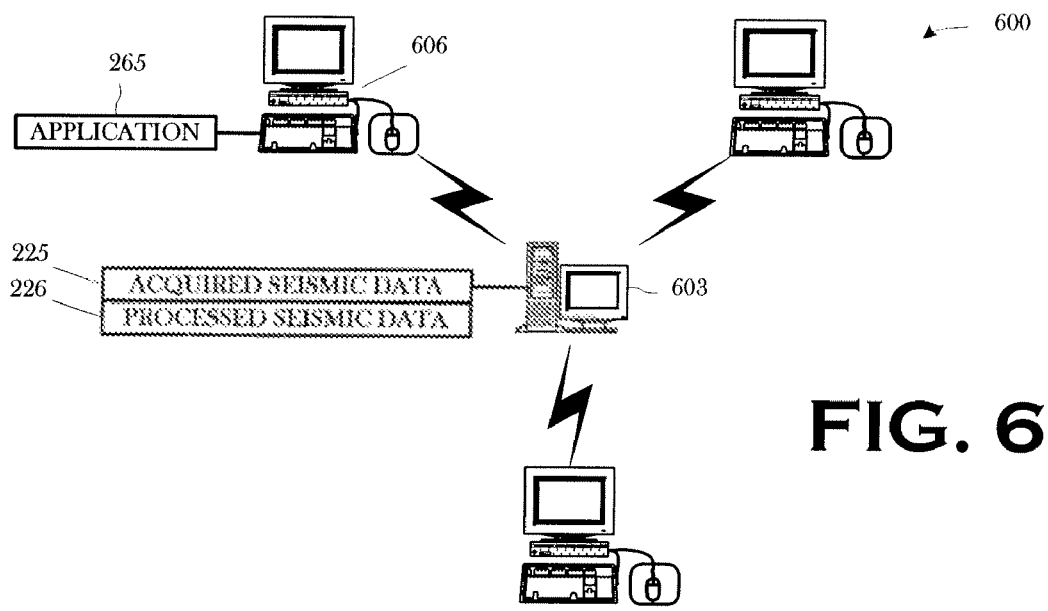
FIG. 6 depicts a distributed computing system on which some aspects of the present invention may be practiced in embodiments alternative to that shown in FIG. 2.

Note that there is no need for the multicomponent seismic data 225 to reside on the same computing apparatus 300 as the application 265 by which it is processed. Some embodiments of the present invention may therefore be implemented on a distributed computing apparatus. Consider, e.g., the computing system 600 in FIG. 6, comprising more than one computing apparatus. For example, the multicomponent seismic data 225 may reside in a data structure residing on a server 603 and the application 265 by which it is processed on a workstation 606 where the computing system 600 employs a networked client/server architecture. Furthermore, although the acquired seismic data 225 is shown residing on the server 603 with the processed seismic data 226, there is no requirement that they reside together.

However, there is no requirement that the computing system 600 be networked. Alternative embodiments may employ, for instance, a peer-to-peer architecture or some hybrid of a peer-to-peer and a client/server architecture. The size and geographic scope of the computing system 600 is not material to the practice of the invention. The size and scope may range anywhere from just a few machines of a Local Area Network ("LAN") located in the same room to many hundreds or thousands of machines globally distributed in an enterprise computing system.

The present invention is not limited by the temporal relationship between acquisition and processing. In the embodiment illustrated immediately above, the processing occurs relatively contemporaneously—e.g., several days to weeks after acquisition. In other embodiments, the acquired seismic data 225 may be "legacy" data—that is, data archived from an old survey. Thus, the period of time elapsed between the acquisition of the seismic data and its processing is not material to the practice of the invention.

Accordingly, in one aspect, the present invention includes a computer-implemented method, such as the method 100 of FIG. 1. In another aspect, the invention includes a computing apparatus such as the computing apparatus 200 of FIG. 2, programmed to perform such a method. In still another aspect, the invention includes a program storage medium such as the optical disk 220, encoded with instructions that, when executed by a computing apparatus, performs a method such as the method 100.

Thus, some portions of the detailed descriptions herein are presented in terms of a software implemented process involving symbolic representations of operations on data bits within a memory in a computing system or a computing device. These descriptions and representations are the means used by those in the art to most effectively convey the substance of their work to others skilled in the art. The process and operation require physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "computing," "calculating," "determining," "displaying," and the like.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

Figure 7A:
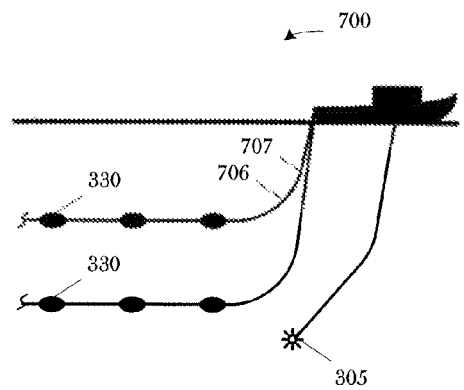
FIG. 7A and FIG. 7B depict two alternative over/under acquisition techniques for acquiring data with which the present invention may be employed.
Figure 7B:
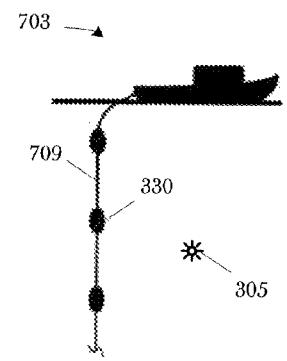

The present invention is also potentially useful for over/under acquisition. FIG. 7A and FIG. 7B illustrate two alternative over/under acquisition techniques 700, 703. FIG. 7A depicts portions of a pair of vertically displaced streamers 706, 707, one towed above the other. Note that variations on this embodiment may employ more than two vertically displaced streamers and may also include horizontally displaced streamers, as well. Each of the streamers 706, 707 comprises a plurality of instrumented sondes 330 as described above that, by virtue of the physical relationship of the streamers 706, 707, are also vertically displaced. FIG. 7B depicts a portion of a vertical streamer 709, comprising a plurality of vertically displaced instrumented sondes 303. Other over/under acquisition may become apparent to those skilled in the art having the benefit of this disclosure.

Figure 7C:
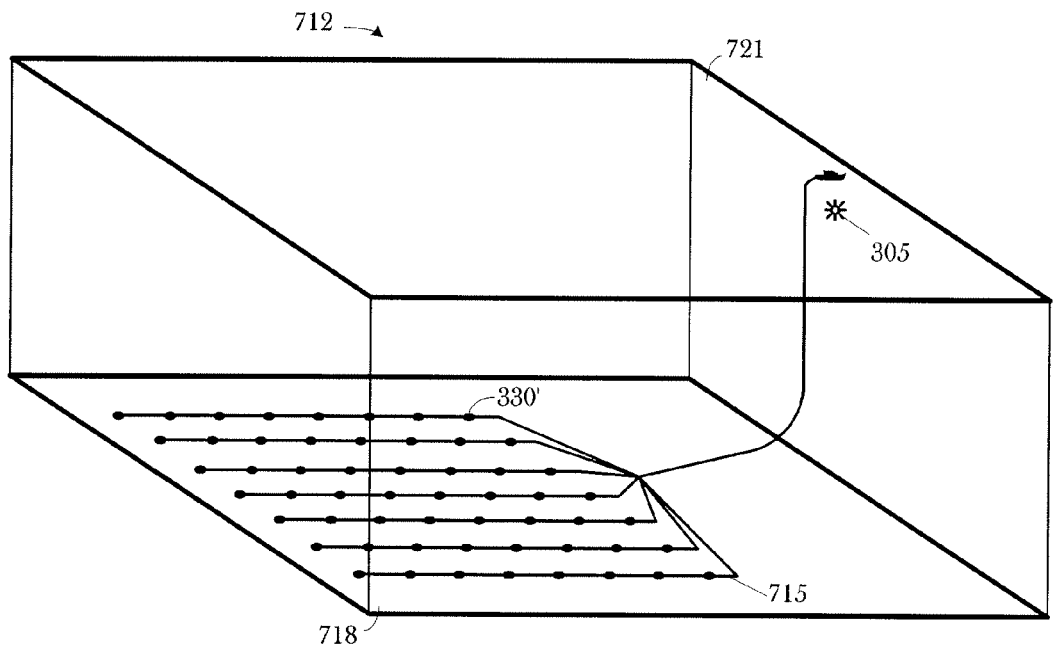
FIG. 7C depicts a seabed survey with which the present invention may be employed.

The present invention may also be used in the context of a seabed survey 712, such as that shown in FIG. 7C in a stylized fashion. A plurality of ocean bottom cables 715 (only one indicated) each comprising a plurality of instrumented sondes 330' (only one indicated), are positioned on the seabed 718. The sondes 330' collect data from reflections generated as previously described and transmits it to the surface 721. The data collection, however, is subject to commonly observed "shear (noise) on vertical". This noise is low-velocity noise looking like shear-waves but recorded on the vertical component of particle motion and masking the compressional-waves. This type of noise is largely absent on the pressure recording and since the acoustic equation of motion is valid for pressure and vertical component data recorded at the seabed, and a free surface is present, the method of the present invention applies.

Now, to further an understanding of the present invention, a more technical discussion of the principles underlying the technique described above will now be presented, beginning with acquisition of the data. In the illustrated embodiment, the acquired seismic data 225 is multicomponent seismic data. Thus, the acquired seismic data 225 comprises pressure data 227 and particle motion data 228.

The particle motion data 228 that is acquired is velocity data, or the time derivative of particle displacement of the passing wavefront. This is but one type of the particle motion data 228 suitable for use in the present invention. Alternative embodiments may, for instance, acquire the acceleration of the passing wavefront, i.e., the time derivative of the particle velocity. Other quantities may also be suitable for use in the present invention. Note further that some embodiments may acquire one type of the particle motion data 228 and convert it in processing to use another. Thus, some embodiments might acquire the velocity data, process it to take the time derivative, and then use the acceleration data in the rest of the method of the invention. Or, some embodiment might acquire the acceleration, integrate it over time to get the velocity, and then use the velocity data in the rest of the method.

Figure 8A:
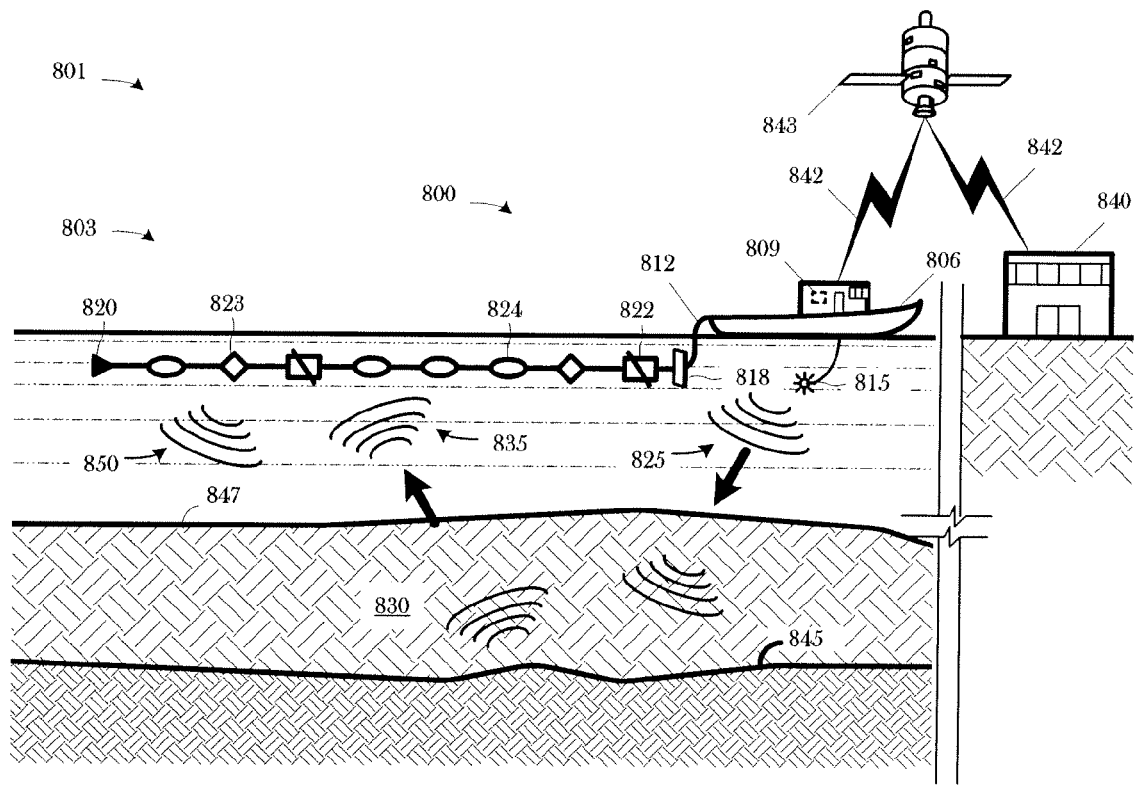
FIG. 8A-FIG. 8B depict a towed array, marine seismic survey practiced in accordance with one aspect of the present invention.
Figure 8B:
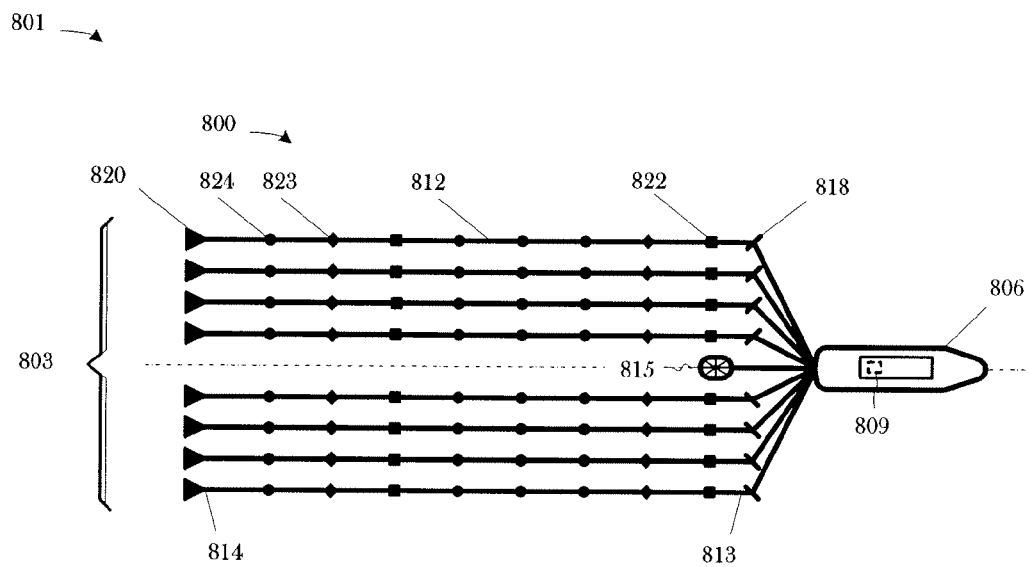
Figure 14A:
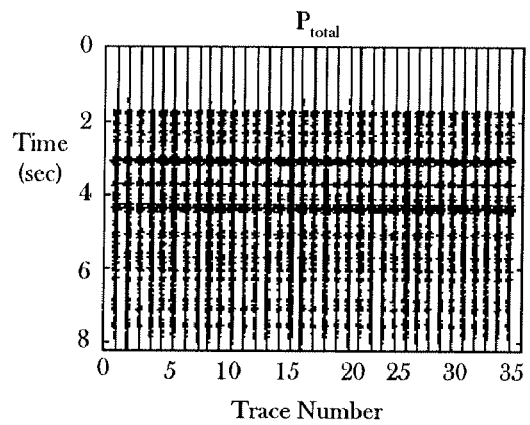
FIG. 14A-FIG. 14D are the wiggle plots of selected characteristics of the synthetic recorded wave field with synthetic noise introduced.
Figure 14B:
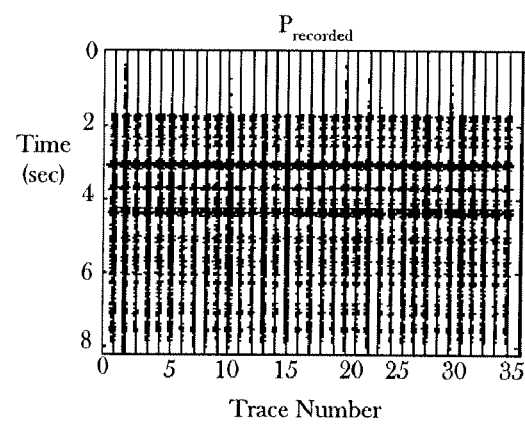
Figure 14C:
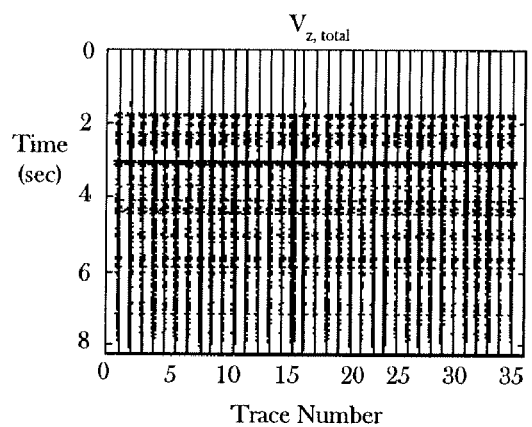
Figure 14D:
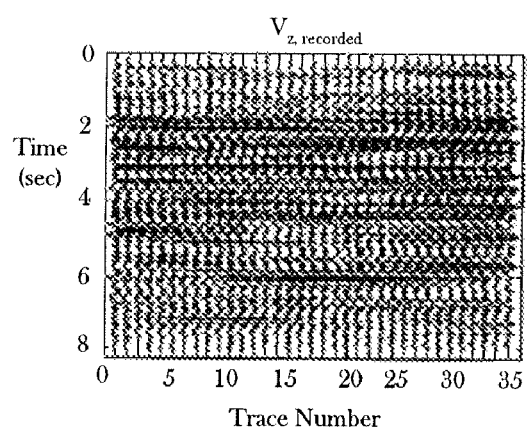

As those in the art having the benefit of this disclosure will appreciate, the acquisition of the seismic data 226 is more complex than is presented above. FIG. 8A and FIG. 8B illustrate a towed array survey system 800 in a towed array marine survey 801 in which the acquired. The survey system 800 generally includes an array 803 towed by a survey vessel 806 on board of which is a computing apparatus 809. The towed array 803 comprises eight marine, towed seismic cables, or streamers, 812 (only one indicated) that may, for instance, each be 8 km long. Alternative embodiments may employ different numbers of streamers 812. In some embodiments, the outermost streamers 812 in the array 803 could be, for example, 900 meters apart.

A seismic source 815 is also shown being towed by the survey vessel 806. Note that, in alternative embodiments, the seismic source 815 may not be towed by the survey vessel 806. Instead, the seismic source 815 may be towed by a second vessel (not shown), suspended from a buoy (also not shown), or deployed in some other fashion known to the art. The known seismic sources include impulse sources, such as explosives and air guns, and vibratory sources which emit waves with a more controllable amplitude and frequency spectrum. The seismic source 815 may be implemented using any such source known to the art. In the illustrated embodiment, the seismic source 815 comprises an air gun or an array of air guns.

At the front of each streamer 812 is a deflector 818 (only one indicated) and at the rear of every streamer 812 is a tail buoy 820 (only one indicated). The deflector 818 laterally, or in the crossline direction, positions the front end 813 of the streamer 812 nearest the survey vessel 806. The tail buoy 820 creates drag at the tail end 814 of the streamer 812 farthest from the survey vessel 806. The tension created on the streamer 812 by the deflector 818 and the tail buoy 820 results in the roughly linear shape of the streamer 812 shown in FIG. 8A.

Located between the deflector 818 and the tail buoy 820 are a plurality of seismic cable positioning devices known as "birds" 822. The birds 822 may be located at regular intervals along the seismic cable, such as every 200 to 400 meters. In this particular embodiment, the birds 822 are used to control the depth at which the streamers 812 are towed, typically a few meters. In one particular embodiment, the steerable birds 818 are implemented with Q-fin™ steerable birds as are employed by Western Geco, the assignee hereof, in their seismic surveys.

The principles of design, operation, and use of such steerable birds are found in PCT International Application WO 00/20895, entitled "Control System for Positioning of Marine Seismic Streamers", filed under the Patent Cooperation Treaty on Sep. 28, 1999, in the name of Services Petroliers Schlumberger as assignee of the inventors Oyvind Hillesund et al. However, any type of steerable device may be employed. For instance, a second embodiment is disclosed in PCT International Application No. WO 98/28636, entitled "Control Devices for Controlling the Position of a Marine Seismic Streamer", filed Dec. 19, 1997, in the name of Geco AS as assignee of the inventor Simon Bittleston. In some embodiments, the birds 818 may even be omitted.

The streamers 812 also include a plurality of instrumented sondes 824 (only one indicated) distributed along their length. The instrumented sondes 824 may be of any suitable construction known to the art and house the sensors (discussed more fully below) used to acquire the data. The sondes 824 are distributed in a manner that permits them to densely sample in the inline direction, e.g., 0.25 m-25 m apart. The sondes 824 may be regularly or irregularly distributed. In the illustrated embodiment, the sondes 824 are regularly distributed and are spaced 3.125 meters apart.

Figure 9:
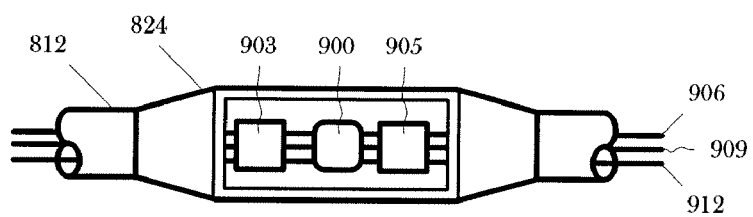
FIG. 9 conceptually depicts one particular sensor arrangement for the seismic survey of FIG. 8A and FIG. 8B.

The instrumented sondes 824 house, in the illustrated embodiment, an acoustic sensor 900, a particle motion sensor 903, and a pressure sensor 905, as is conceptually shown in FIG. 9. The acoustic sensor 900 may be implemented using, e.g., a hydrophone such as is known to the art. The acoustic sensor 900 acquires the "pressure data" 227 indicating the magnitude and time of arrival for passing wavefronts in a conventional manner well known to the art. The pressure sensor 905 record pressure as a function of time for use in determining the height of the water column above the acoustic sensor 900 as is described more fully below.

The particle motion sensors 903 measure not only the magnitude of passing wavefronts, but also their direction. The particle motion sensor 903 may be implemented using, for example, at least two co-located sensors in different (preferably orthogonal) directions in the plane perpendicular to the inline axis of the streamer 812. Suitable particle motion sensors are disclosed in:

U.S. application Ser. No. 10/792,511, entitled "Particle Motion Sensor for Marine Seismic Sensor Streamers," filed Mar. 3, 2004, in the name of the inventors Stig Rune Lennart Tenghamn and Andre Stenzel (published Sept. 8, 2005, as Publication No. 2005/0194201);

U.S. application Ser. No. 10/233,266, entitled "Apparatus and Methods for Multicomponent Marine Geophysical Data Gathering," filed Aug. 30, 2002, in the name of the inventors Stig Rune Lennart Tenghamn et al. (published Mar. 4, 2004, as Publication No. 2004/0042341), now issued as U.S. Letters Patent 7,239,577; and U.S. Letters Patent 3,283,293, entitled "Particle Velocity Detector and Means for Canceling the Effects of Motional Disturbances Applied Thereto," naming G. M. Pavey, Jr. et al. as inventors, and issued Nov. 1, 1966.

Any suitable particle motion sensor known to the art may be used to implement the particle motion sensor 903. Thus, it would be possible to distinguish data representing upwardly propagating wavefronts, such as the reflections 835, from the downwardly propagating wavefronts, such as the multiple reflection 850.

As noted elsewhere, particle velocity is but one vector quantity associated with the passing wavefront that may be used. Thus, in some embodiments, instead of the particle velocity, the particle acceleration may be measured using a suitable accelerometer. Suitable accelerometers include geophone accelerometers ("GACs"), such as are commonly known in the art for use in land-based seismic surveying, or micro electro-mechanical systems ("MEMS") accelerometer. Suitable MEMS accelerometers are known to the art. For example, MEMS accelerometers are disclosed in:

United States Letters Patent 5,723,790, entitled "Monocrystalline Accelerometer and Angular Rate Sensor and Methods for Making and Using Same", issued Mar. 3, 1998, and naming Gert Andersson as inventor ("the '790 patent") U.S. patent application Ser. No. 11/042,721, entitled "System and Method for a Three-Axis MEMS Accelerometer", filed Jun. 24, 2005, published Jul. 28, 2005, as Publication No. 2005/0160814 A1, and naming Vladimir Vaganov and Nikolai Belov as inventors, now issued as U.S. Letters Patent 7,367,232;

U.S. patent application Ser. No. 11/000,652, entitled "Micro -Machined Electromechanical System (MEMS) Accelerometer Device Having Arcuately Shaped Flexures", filed Nov. 30, 2004, published Sep. 15, 2005, as Publication No. 2005/0202585 A1, and naming Mark H. Eskridge as inventor, now issued as U.S. Letters Patent 6,991,957; and International Patent Application Serial No. PCT/GB2004/00 1036, entitled "MEMS Accelerometers", filed Mar. 11, 2004, published Sep.25, 2004, as Publication No. WO 2004/081583, and naming Diana Hodgins and Joseph Mark Hatt as inventors.

However, any suitable accelerometer known to the art may be used.

The streamer 812 also provides a way to measure or detect the orientation of the particle motion sensors 903 with respect to the sea-surface or gravity field. The particle motion sensor 903 is ideally oriented to measure in the "true" vertical direction. However, this is frequently not the case, as the streamers 812 can rotate and twist during the seismic survey 800. It is therefore desirable to know the true orientation of the particle motion sensor 903 relative to the vertical so that a correction may be effected during processing.

This may be done using inclinometers, for example. The inclinometer may be a single and/or dual axis accelerometer formed on an integrated circuit chip, such as the ADXL 103/203 single/dual axis accelerometer produced by Analog Devices or that disclosed in U.S. application Serial No. 10/623,904, entitled "Cable Motion Detection", filed Jul. 21, 2003, published Jan. 27, 2005, as Publication No. 2005/0018537, in the name of Kenneth E. Welker and Nicolas Goujon, and commonly assigned herewith. Alternatively, the DC component from MEMS sensors in embodiments where MEMS sensors are used. Note that this means, in embodiments using MEMS sensors, there may not be a separate pressure sensor 905.

Some embodiments may employ additional sensors over and above those shown. Some embodiments may employ a third sensor to measure the inline particle velocity. If a third particle motion sensor measuring the inline particle velocity is present an extra inclinometer measuring the inline angle of the sensor with respect to the sea-surface is included.

In general, it is desirable for the measurements of the particle motion sensors 903 be taken as close to the point the seismic data is acquired by the acoustic sensors 900 as is reasonably possible to reduce pre-processing. However, it is not necessary that the particle motion sensor 903 be positioned together with the acoustic sensor 900 within the sensor sonde 824 as is the case for the illustrated embodiment. Alternative embodiments may position the particle motion sensors 903 on the streamer 812 without regard to the positions of the acoustic sensors 900, even to the extent that the two groups of sensors may employ different inline spacings along the streamer 812. In these circumstances, vertical motion data can be interpolated inline during processing using techniques known to the art.

The sensors of the instrumented sondes 824 then transmit data representative of the detected quantity over the electrical leads of the streamer 812. The data from the acoustic sensors 900, the particle motion sensors 903, and the sensor orientation sensors 905 may be transmitted over separate lines. However, this is not necessary to the practice of the invention. Size, weight, and power constraints will typically make separate lines desirable. The data generated will therefore need to be interleaved with the seismic data. Techniques for interleaving information with this are known to the art. For instance, the two kinds of data may be multiplexed. Any suitable technique for interleaving data known to the art may be employed.

Referring now to FIG. 8A-FIG. 8B and FIG. 9, the data generated by the sensors of the instrumented sondes 824 is transmitted over the seismic cable to the computing apparatus 809. As those in the art will appreciate, a variety of signals are transmitted up and down the streamer 812 during the seismic survey. For instance, power is transmitted to the electronic components (e.g., the acoustic sensor 900 and particle motion sensor 903), control signals are sent to positioning elements (e.g., the deflectors 818, birds 822), and data is transmitted back to the survey vessel 810. To this end, the streamer 812 provides a number of lines (i.e., a power lead 906, a command and control line 909, and a data line 912) over which these signals may be transmitted. Those in the art will further appreciate that there are a number of techniques that may be employed that may vary the number of lines used for this purpose. Furthermore, the streamer 812 will also typically include other structures, such as strengthening members (not shown), that are omitted for the sake of clarity.

The survey vessel 806 tows the array 803 across the survey area in a predetermined pattern. The predetermined pattern is basically comprised of a plurality of "sail lines" along which the survey vessel 806 will tow the array 803. Thus, at any given time during the survey, the survey vessel 806 will be towing the array 803 along a predetermined sail line 853. The seismic source 815 generates a plurality of seismic survey signals 825 in accordance with conventional practice as the survey vessel 806 tows the array 803.

The seismic survey signals 825 propagate and are reflected by the subterranean geological formation 830. The geological formation 830 presents a seismic reflector 845. As those in the art having the benefit of this disclosure will appreciate, geological formations under survey can be much more complex. For instance, multiple reflectors presenting multiple dipping events may be present. FIG. 8A-FIG. 8B omit these additional layers of complexity for the sake of clarity and so as not to obscure the present invention. The sensors 900, 903 detect the reflected signals 835 from the geological formation 830 while the sensor 905 detects the sensor's orientation relative to the gravitational field or water surface.

The sensors 900, 903 (shown in FIG. 9) in the instrumented sondes 824 then generate data representative of the reflections 835 and the associated particle motion, and the seismic data is embedded in electromagnetic signals. The sensor 905 generates data representative of the pressure exerted by the water above the sensor 905. The signals generated by the sensors 900, 903, and 905 are communicated to the computing apparatus 809. The computing apparatus 809 collects the data for processing. The computing apparatus 809 is centrally located on the survey vessel 810. However, as will be appreciated by those skilled in the art, various portions of the computing apparatus 809 may be distributed in whole or in part, e.g., across the seismic recording array 805, in alternative embodiments.

The computing apparatus 809 may process the seismic data itself, store the seismic data for processing at a later time, transmit the seismic data to a remote location for processing, or some combination of these things. Typically, processing occurs on board the survey vessel 806 or at some later time rather than during the seismic survey 800 because of a desire to maintain production. The data may therefore be stored on a portable magnetic storage medium (not shown) or wirelessly transmitted from the survey vessel 806 to a processing center 840 for processing in accordance with the present invention. Typically, in a marine survey, this will be over satellite links 842 and a satellite 843. Note that some alternative embodiments may employ multiple data collection systems 820.

Figure 10:
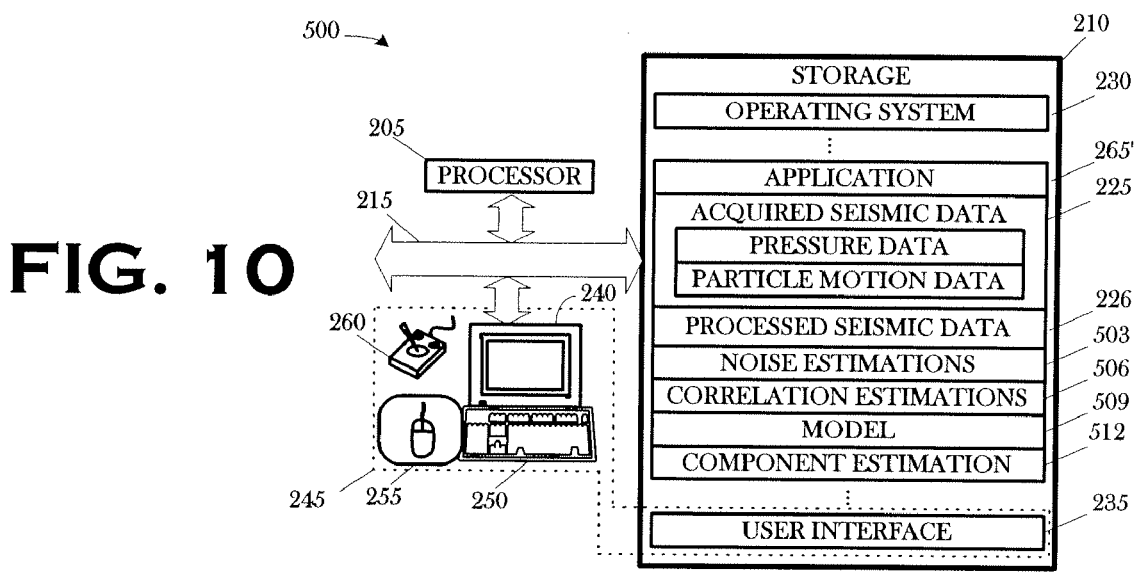
FIG. 10 depicts one particular implementation of a computing apparatus as used in one particular embodiment in accordance with one aspect of the invention.

In the illustrated embodiment, the acquired seismic data 225 is processed at the processing center 840. The processing center 840 will typically house a distributed computing system such as the computing system 400 shown in FIG. 4. Thus, a user (not shown) invokes the application 265 residing on, for example, the computing apparatus 500 of FIG. 10, which then accesses the acquired seismic data 225 and processes it.

In seismic acquisition, acoustic waves reflected from interior layers of the earth propagate towards the sea surface. An acoustic pressure wave $p_u(t,x,y,z)$ can be written as a linear superposition of plane waves at frequency f wave number vector $\vec{k}=[k_x,k_y,k_z]$ and $\vec{n}$ is the vector $\vec{n}=x\hat{a}_x+y\hat{a}_y+z\hat{a}_z$ which is defined in terms of the unit coordinate vectors $\hat{a}_x$, $\hat{a}_y$ and $\hat{a}_z$:

$$p_u(t, x, y, z) = \partial M_u(f, k_x, k_y)e^{j2p(ft-\vec{k}\cdot\vec{r})}dfdk_xdk_y \quad (1)$$
$$= \partial P_u(f, k_x, k_y)dfdk_xdk_y$$

wherein:

$$P_u(f, k_x, k_y) = M_u(f, k_x, k_y)e^{j2p(ft-\vec{k}\cdot\vec{n})};$$

"·" denotes dot product;

$M_u(f,k_x,k_y)$ is the amplitude of the plane wave; and $k_x$, $k_y$ and $k_z$ are the wave numbers along the x (inline), y (crossline) and z (vertical) directions, respectively.

For a plane wave propagating towards the sea surface the vertical wave number is nonnegative, and it is related to the horizontal wave numbers $k_x$, $k_y$, acoustic speed of the sound in water, c, and frequency f through the following relation:

$$k_z=\sqrt{f^2/c^2-k_x^2-k_y^2} \quad (2)$$

Also we have the following relations between the wave numbers $k_x$, $k_y$, $k_z$; apparent wave lengths $\lambda_x$, $\lambda_y$, $\lambda_z$; apparent velocities $v_x$, $v_y$, $v_z$; and the frequency f:

$$k_x=1/\lambda_x=f/v_x,\; k_y=1/\lambda_y=f/v_y,\; k_z=1/\lambda_z=f/v_z \quad (3)$$

When a plane wave is reflected from the sea surface, its direction of propagation is reversed in the z direction. Hence, the reflected wave field $p_d(t,x,y,z)$ propagates downwards towards the sea bottom:

$$p_d(t, x, y, z) = \xi \int M_u(f, k_x, k_y)e^{j2\pi(ft-\vec{k}\cdot\vec{n}_r)}dfdk_xdk_y \quad (4)$$
$$= \xi \int M_u(f, k_x, k_y)e^{j2\pi(ft-\vec{k}\cdot\vec{n})}e^{j4\pi k_z z}dfdk_xdk_y$$
$$= \xi \int P_u(f, k_x, k_y)e^{j4\pi k_z z}dfdk_xdk_y$$

where:

$\xi$ is the reflection coefficient of the sea surface; and $\vec{n}_r$ is $x\hat{a}_x+y\hat{a}_y-z\hat{a}_z$ is.

For a flat sea surface, a common approximation is $\xi=-1$. Hence, pressure sensors on a streamer located at a depth of $z_s$ record the following total wave field:

$$p(t, x, y, z_s) = p_u(t, x, y, z_s) + p_d(t, x, y, z_s) + n_p(t, x, y, z_s) \quad (5)$$
$$= \int P_u(f, k_x, k_y)(1 + \xi e^{j4\pi k_z z_s})df dk_x dk_y +$$
$$n_p(t, x, y, z_s)$$

where:

$n_p(t, x, y, z_s)$ is noise on pressure measurement.

In the frequency-wave number domain, the measurement model simplifies to:

$$P(f,k_x,k_y)=(1+\xi e^{j4\pi f k_z z_s})P_u(f,k_x,k_y)+N_p(f,k_x,k_y) \quad (6)$$

where:

$P(f,k_x,k_y)$ is the Fourier transforms of $p(t,x,y,z)$ along time, in-line and cross-line directions; and $N_p(f,k_x,k_y)$ is the Fourier transforms of $n_p(t,x,y,z)$ along time, in-line and cross-line directions.

As described above, the seismic survey measures the gradients of the wave field along the orthogonal Cartesian coordinates. These measurements would be:

$$V_x(f, k_x, k_y) = \frac{ck_x}{f}(1 + \xi e^{j4\pi k_z z_s})P_u(f, k_x, k_y) + N_x(f, k_x, k_y) \quad (7)$$
$$V_y(f, k_x, k_y) = \frac{ck_y}{f}(1 + \xi e^{j4\pi k_z z_s})P_u(f, k_x, k_y) + N_y(f, k_x, k_y)$$
$$V_z(f, k_x, k_y) = \frac{ck_z}{f}(1 + \xi e^{j4\pi k_z z_s})P_u(f, k_x, k_y) + N_z(f, k_x, k_y)$$

where:

$V_x(f,k_x,k_y)$, $V_y(f,k_x,k_y)$ and $V_z(f,k_x,k_y)$ are the particle velocity measurements along the x, y and z axes, respectively, and $N_x(f,k_x,k_y)$, $N_y(f,k_x,k_y)$ and $N_z(f,k_x,k_y)$ are the corresponding measurement noises.

To have pressure equivalent units, particle velocity measurements in this equation were scaled by acoustic impedance rc in water, where r is the density of water. Note that, the contribution of sea surface ghost to the z component of the particle motion sensor is $-\xi$ rather than $\xi$, because these sensors are direction sensitive and after reflection from surface, z component of the reflected wave propagates in reverse direction.

The wave field separation problem is defined as estimating the up-going wave field $P_u(f,k_x,k_y)$ from the available measurements:

$$M(f,k_x,k_y)=H(f,k_x,k_y)P_u(f,k_x,k_y)+N(f,k_x,k_y) \quad (8)$$

where:

$M(f,k_x,k_y)$, $H(f,k_x,k_y)$ and $N(f,k_x,k_y)$ denote vector of measurements, transfer functions and measurement noises, respectively:

$$M(f, k_x, k_y) = \begin{bmatrix} P(f, k_x, k_y)V_x(f, k_x, k_y) \\ V_y(f, k_x, k_y)V_z(f, k_x, k_y) \end{bmatrix}^T \quad (9)$$

$$H(f, k_x, k_y) = \begin{bmatrix} (1 + \xi e^{j4\pi k_z z_s})\frac{ck_x}{f}(1 + \xi e^{j4\pi k_z z_s}) \\ \frac{ck_y}{f}(1 + \xi e^{j4\pi k_z z_s})\frac{ck_z}{f}(1 + \xi e^{j4\pi k_z z_s}) \end{bmatrix}^T$$

$$N(f, k_x, k_y) = \begin{bmatrix} N_p(f, k_x, k_y)N_x(f, k_x, k_y) \\ N_y(f, k_x, k_y)N_z(f, k_x, k_y) \end{bmatrix}^T$$

where:

T stands for transpose operation.

Without loss of generality we assume that measurement noises are zero mean. We denote the covariance matrix of the measurement noise as $C(f,k_x,k_y)=E[N(f,k_x,k_y)N^H(f,k_x,k_y)]$, where E[ ] is the statistical expectation operator.

To find the optimal estimate of the up-going wave field $P_u(f,k_x,k_y)$ we define a cost function J $$J = (M - HP_u)^H C^{-1}(M - HP_u) \quad (10)$$

where:

H is the Hermitian operator.

In this equation, we have made the following abbreviations for notational simplicity: $M=M(f,k_x,k_y)$, $H=H(f,k_x,k_y)$, $C=C(f,k_x,k_y)$ and $P_u=P_u(f,k_x,k_y)$. By completing the square, the cost function J can be written as $$J = \left| P_u - \frac{H^H C^{-1}}{H^H C^{-1} H} M \right|^2 (H^H C^{-1} H) + M^H \left[ C^{-1} - \frac{C^{-1} H H^H C^{-1}}{H^H C^{-1} H} \right] M \quad (11)$$

Since, C is a positive definite matrix, the optimal value of $P_u$ that minimizes J is given by $$\hat{P}_u = \underset{P_u}{\arg\min} J = \frac{H^H C^{-1}}{H^H C^{-1} H} M \quad (12)$$

We call this technique of estimating up-going wave field from multi sensor measurements as optimal de-ghosting (ODG) technique. The estimate obtained by ODG technique has following statistical properties:

It is an unbiased estimate, since $E[\hat{P}_u]=E[P_u+(H^H C^{-1})/(H^H C^{-1} H)N]=P_u$, which can be shown by inserting (8) into (12).

It is the linear minimum mean-square-error estimate of the up-going pressure wave $P_u$, i.e., among all possible linear combinations of pressure and particle velocity measurements, this one gives the smallest estimation error.

It maximizes the signal-to-noise ratio on up-going pressure wave estimate

When the measurement noise is Gaussian, it has the following additional properties:

It is the maximum likelihood estimate

It is the minimum variance unbiased estimate, i.e., among all possible estimators, this one gives the smallest estimation error.

The estimation error variance for ODG is given by $$Var[\vec{P}_u] = E[|\hat{P}_u - P_u|^2] = H^H C^{-1} H \quad (13)$$

Note that, as an aid for stabilization when the denominator of (12) is close to zero, the following regularization can be used in (12):

$$\hat{P}_u = \frac{H^H C^{-1}}{H^H C^{-1} H + \delta^2} M \quad (14)$$

where:

$d^2$ is a small positive number.

We have observed that this regularization is useful for about 0-3 Hz. Once optimal value of $P_u$ is estimated, optimal value of down-going pressure; the inline (x), cross-line (y) and vertical (z) components of the up-going (with subscript u) and down-going (with subscript d) waves are obtained as:

$$\hat{P}_d(f, k_x, k_y) = (\xi e^{j4\pi k_z z_s})\hat{P}_u(f, k_x, k_y) \quad (15)$$

$$\hat{V}_{x,u}(f, k_x, k_y) = \frac{ck_x}{f}\hat{P}_u(f, k_x, k_y),$$

$$\hat{V}_{x,d}(f, k_x, k_y) = \frac{ck_x \xi e^{j4\pi k_z z_s}}{f}\hat{P}_u(f, k_x, k_y)$$

$$\hat{V}_{y,u}(f, k_x, k_y) = \frac{ck_y}{f}\hat{P}_u(f, k_x, k_y),$$

$$\hat{V}_{y,d}(f, k_x, k_y) = \frac{ck_y \xi e^{j4\pi k_z z_s}}{f}\hat{P}_u(f, k_x, k_y)$$

$$\hat{V}_{z,u}(f, k_x, k_y) = \frac{ck_y}{f}\hat{P}_u(f, k_x, k_y),$$

$$\hat{V}_{z,d}(f, k_x, k_y) = \frac{ck_z \xi e^{j4\pi k_z z_s}}{f}\hat{P}_u(f, k_x, k_y)$$

In a multicomponent survey, such as the survey 800 shown in FIG. 8, if only pressure, cross-line and vertical components of the particle motion are available and if the noise on these measurements are uncorrelated the optimal estimate of the up-going wave field can be compactly written as:

$$\hat{P}_u(f, k_x, k_y) = \quad (16)$$

$$\frac{\dfrac{P(f, k_x, k_y)H_p^*(f, k_x, k_y)}{\sigma_p^2(f, k_x, k_y)} + \dfrac{V_y(f, k_x, k_y)H_y^*(f, k_x, k_y)}{\sigma_y^2(f, k_x, k_y)} + \dfrac{V_z(f, k_x, k_y)H_z^*(f, k_x, k_y)}{\sigma_z^2(f, k_x, k_y)}}{\dfrac{|H_p(f, k_x, k_y)|^2}{\sigma_p^2(f, k_x, k_y)} + \dfrac{|H_y(f, k_x, k_y)|^2}{\sigma_y(f, k_x, k_y)} + \dfrac{|H_z(f, k_x, k_y)|^2}{\sigma_z^2(f, k_x, k_y)}}$$

where:

$\sigma_p^2(f,k_x,k_y)$, $\sigma_y^2(f,k_x,k_y)$ and $\sigma_z^2(f,k_x,k_y)$ are variances of the measurement noises $N_p(f,k_x,k_y)$, $N_y(f,k_x,k_y)$ and $N_z(f,k_x,k_y)$.

The corresponding estimation error variance is given by $$\operatorname{Var}[\hat{P}_u(f,k_x,k_y)] = \frac{1}{\frac{|H_p(f,k_x,k_y)|^2}{\sigma_p^2(f,k_x,k_y)} + \frac{|H_y(f,k_x,k_y)|^2}{\sigma_y^2(f,k_x,k_y)} + \frac{|H_z(f,k_x,k_y)|^2}{\sigma_z^2(f,k_x,k_y)}} \quad (17)$$

Hence, we have the following expression for signal-to-noise ratios before and after ODG:

$$SNR_\chi(f,k_x,k_y) = \frac{|H_\chi(f,k_x,k_y)|^2}{\sigma_\chi^2(f,k_x,k_y)}|P_u(f,k_x,k_y)|^2, \quad (18)$$

for $\chi = p, y$ and $z$ $$SNR_{ODG}(f,k_x,k_y) = \left( \frac{\frac{|H_p(f,k_x,k_y)|^2}{\sigma_p^2(f,k_x,k_y)} +}{\frac{|H_y(f,k_x,k_y)|^2}{\sigma_y^2(f,k_x,k_y)} + \frac{|H_z(f,k_x,k_y)|^2}{\sigma_z^2(f,k_x,k_y)}} \right)|P_u(f,k_x,k_y)|^2$$

We note that, this is the algebraic sum of the input SNRs. Hence, in optimal waveform separation, the output SNR is sum of the input SNRs and it cannot be worse than SNR in the best measurement.

In over-under data acquisition, such as the one shown in FIG. 7A, K different streamers record the pressure field at different depths:

$$P_k(f,k_x,k_y) = H_{pk}(f,k_x,k_y)P_u(f,k_x,k_y) + N_{pk}(f,k_x,k_y), \; k=1, K, K \quad (19)$$

where:

$H_{pk}(f,k_x,k_y) = (1 + xe^{j4pk_{zsk}})$ is the transfer function describing the effect of sea surface ghost at streamer depth $z_{sk}$; and $N_{pk}(k,k_x,k_y)$ is the measurement noise on the k-th streamer. We have a measurement model similar to Eq. (8):

$$M_{ou}(f,k_x,k_y) = H_{ou}(f,k_x,k_y)P_u(f,k_x,k_y) + N_{ou}(f,k_x,k_y) \quad (20)$$

where:

$$M_{ou}(f,k_x,f_y) = \begin{bmatrix} P_1(f,k_x,k_y)P_2(f,k_x,k_y) \dots \\ P_K(f,k_x,k_y) \end{bmatrix}^T \quad (21)$$

$$H_{ou}(f,k_x,f_y) = \begin{bmatrix} H_{p1}(f,k_x,k_y)H_{p2}(f,k_x,k_y) \dots \\ H_{pK}(f,k_x,k_y) \end{bmatrix}^T$$

$$N_{ou}(f,k_x,f_y) = \begin{bmatrix} N_{p1}(f,k_x,k_y)N_{p2}(f,k_x,k_y) \dots \\ N_{pK}(f,k_x,k_y) \end{bmatrix}^T$$

The optimal estimate of the up-going wave field has a form similar to Eq. (12):

$$\hat{P}_u(f,k_x,k_y) = \frac{H_{ou}^H(f,k_x,k_y)C_{ou}^{-1}(f,k_x,k_y)}{H_{ou}^H(f,k_x,k_y)C_{ou}^{-1}(f,k_x,k_y)H_{ou}(f,k_x,k_y)}M_{ou}(f,k_x,k_y) \quad (22)$$

where:

$C_{ou}(f,k_x,k_y) = E[N_{ou}(f,k_x,k_y)N_{ou}^H(f,k_x,k_y)]$.

In the case of uncorrelated measurements, this expression simplifies to:

$$\hat{P}_u(f,k_x,k_y) = \sum_{k=1}^{K} \frac{SNR_{pK}(f,k_x,k_y)}{SNR_{p1}(f,k_x,k_y) + \dots + SNR_{pK}(f,k_x,k_y)} \frac{P_k(f,k_x,k_y)}{H_{pK}(f,k_x,k_y)} \quad (23)$$

where:
the SNR for the k-th streamer is given by
$SNR_{pk}(f,k_x,k_y) = |H_{pk}(f,k_x,k_y)|^2/\sigma_{pk}^2(f,k_x,k_y)$
in terms of the transfer function $H_{pk}(f,k_x,k_y)$ and variance $\sigma_{pk}^2(f,k_x,k_y) = \operatorname{Var}[N_{pk}(f,k_x,k_y)]$.

In some applications, by making some assumptions on the acquisition geometry, a reduced dimensional approximation can be obtained for the ODG solution. For instance, if the earth layers are invariant in cross-line direction, then for small cross line offsets, it can be assumed that $k_y \cong 0$. Hence ODG will reduce to the following 2D version:

$$\hat{P}_u(f,k_x) = \frac{\frac{P(f,k_x)H_p^*(f,k_x)}{\sigma_p^2(f,k_x)} + \frac{V_z(f,k_x)H_z^*(f,k_x)}{\sigma_z^2(f,k_x)}}{\frac{|H_p(f,k_x)|^2}{\sigma_p^2(f,k_x)} + \frac{|H_z(f,k_x)|^2}{\sigma_z^2(f,k_x)}} \quad (24)$$

Furthermore, if the up going wavefield will be computed for a small range of in line offsets with respect to the source position, vertical incidence approximation usually provides satisfactory results. In this case, we will have $k_x \cong 0$, $k_y \cong 0$ and the ODG will reduce to the following 1D version:

$$\hat{P}_u(f) = \frac{\frac{P(f)H_p^*(f)}{\sigma_p^2(f)} + \frac{V_z(f)H_z^*(f)}{\sigma_z^2(f)}}{\frac{|H_p(f)|^2}{\sigma_p^2(f)} + \frac{|H_z(f)|^2}{\sigma_z^2(f)}} \quad (25)$$

Note that the wave fields and transfer functions do not have wave number dependence ($k_x = k_y = 0$), we have expressed the wavefields, transfer functions and noise levels only as a function of frequency.

In any case, in this particular implementation, the technique first estimates the second order statistics of noise terms on different measurements. These statistics include correlations and covariances and can be easily estimated from noise only parts of the seismic data. In the proposed method a rough estimate of these statistics is also sufficient. Then, the optimal estimate of the up-going wave field which minimizes the fit error between the actual measurement and estimated measurement calculated by using the physical propagation model is found. The "optimal" solution uses "all measurements", and the contribution of each measurement to the model is a function of correlations between different measurements and the physical propagation model.

The efficacy of the present invention has been established using a real data sample. To illustrate the performance of the present invention compared with standard deghosting technique, a synthetic up-going pressure wave field was generated. FIG. 11A-FIG. 11B show the frequency/wave number ("FK") spectrum and the corresponding time traces for the up-going component Pup of the synthetic, recorded wave field. Then the total wave field that would be recorded by hydrophones and particle motion sensors on a streamer at 18.5 m depth has been generated by assuming flat sea surface. The FK spectrum and the corresponding time traces for total pressure $P_{total}$ and total vertical velocity $V_{z\ total}$ wave fields are shown in FIG. 12A-FIG. 12B and FIG. 13A-FIG. 13B, respectively. The loss of information due to sea surface reflections present itself as notches in FK spectrum. The notch frequencies are 40.5 Hz, 81 Hz and 121.5 for pressure measurement and 20.3 Hz, 60.8 Hz and 101.4 Hz for vertical component of the particle velocity measurement.

FIG. 14A, FIG. 14B, FIG. 14C, and FIG. 14D show an example of seismic data that would be recorded in the presence of noise. The recorded seismic data have been simulated by combining noise-free total wave fields illustrated in FIG. 11A, FIG. 11B, FIG. 12A, FIG. 12B, FIG. 13A, and FIG. 13B with some "synthetically generated noise records" for pressure and particle velocity measurements. In this particular example, the vertical particle velocity measurement is dominated by low frequency vibration noise.

Figure 15:
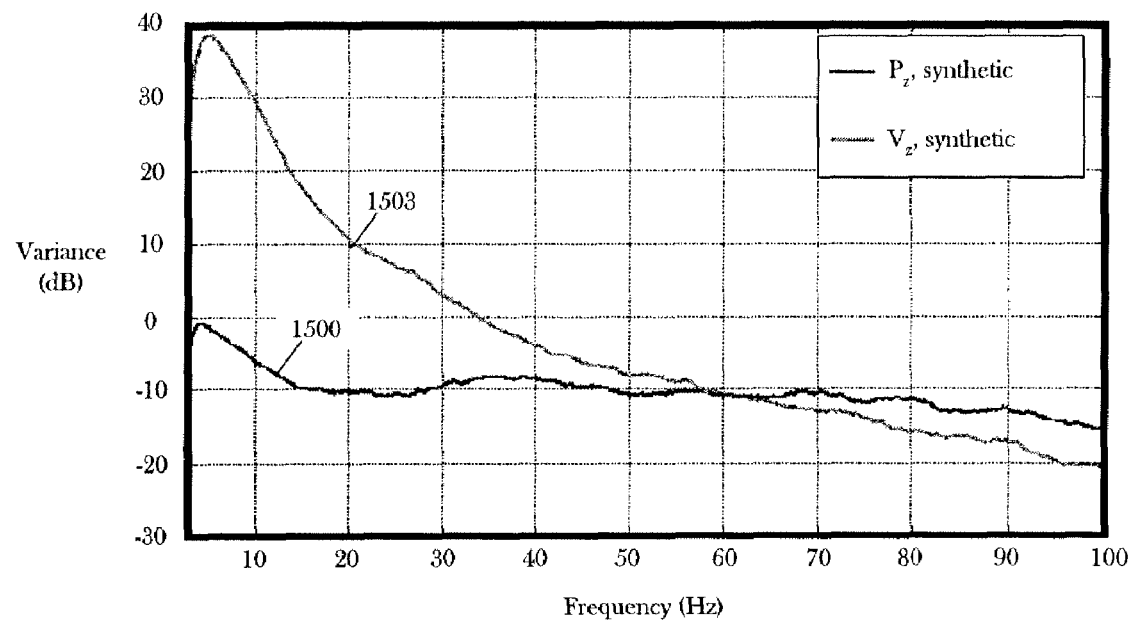
FIG. 15 graphs the variances of the synthetic noise in the pressure and vertical displacement components of the synthetic recorded wave field.

The variances of the noise records are shown in FIG. 15 for this particular example. More particularly, the measurement noise variances pressure 1500 and vertical particle velocity 1503. Below 40 Hz, low frequency noise dominates particle velocity measurement and above 60 Hz, particle velocity measurement is quieter than the pressure measurement. FIG. 16A, FIG. 16B, FIG. 17A, and FIG. 17B show the actual and estimated up-going and down-going wave fields. Being a model based technique; ODG provides consistent estimates of up and down-going wave fields.

Figure 18:
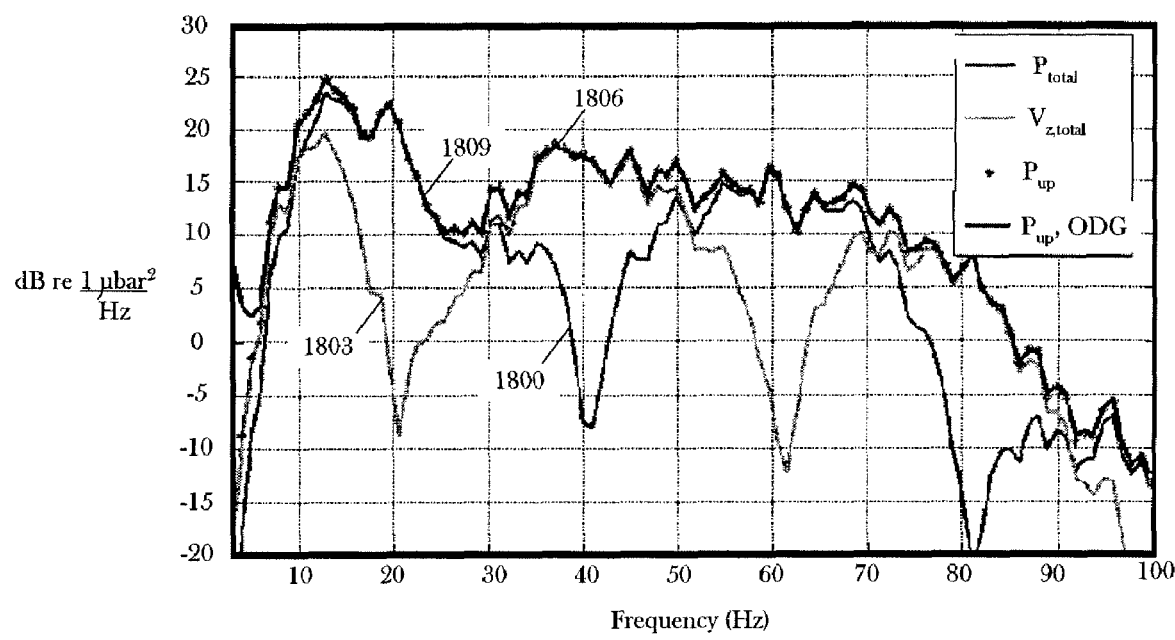
FIG. 18 is a graph demonstrating how the present invention fills notches in the spectrum of a recorded wave field using the data resulting from the application of the present invention to the synthetic recorded wave field.
Figure 16A:
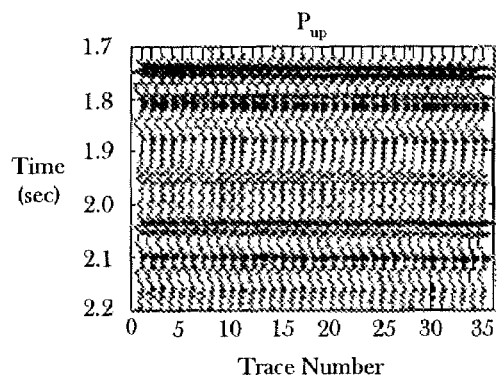
FIG. 16A-FIG. 16B and FIG. 17A-FIG. 17B illustrate the true and estimated up-going and down-going components of the synthetic recorded wave field, the estimated components being estimated using the method of the present invention.
Figure 16B:
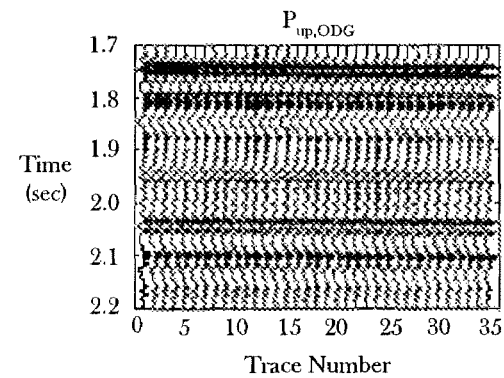
Figure 17A:
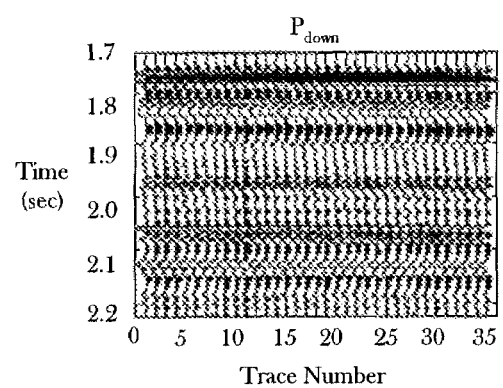
Figure 17B:
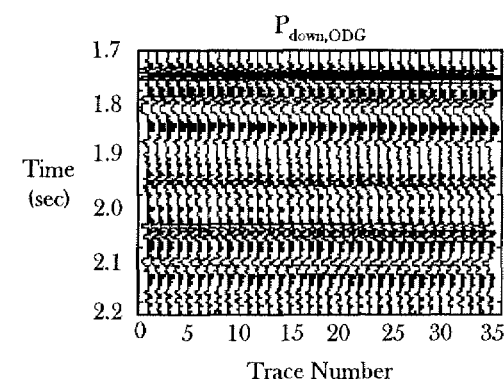

FIG. 18 shows the total pressure measurement, vertical particle velocity measurement, the up-going component in the total pressure measurement and estimate of the up-going pressure component by optimal de-ghosting technique. In this plot, only the signal component has been shown. The estimate by ODG closely matches to the actual up-going wave field component. Hence, ODG successfully fills all the notches in the spectrum accept for the one at f=0 and it gives an accurate estimate of the signal.

Figure 19:
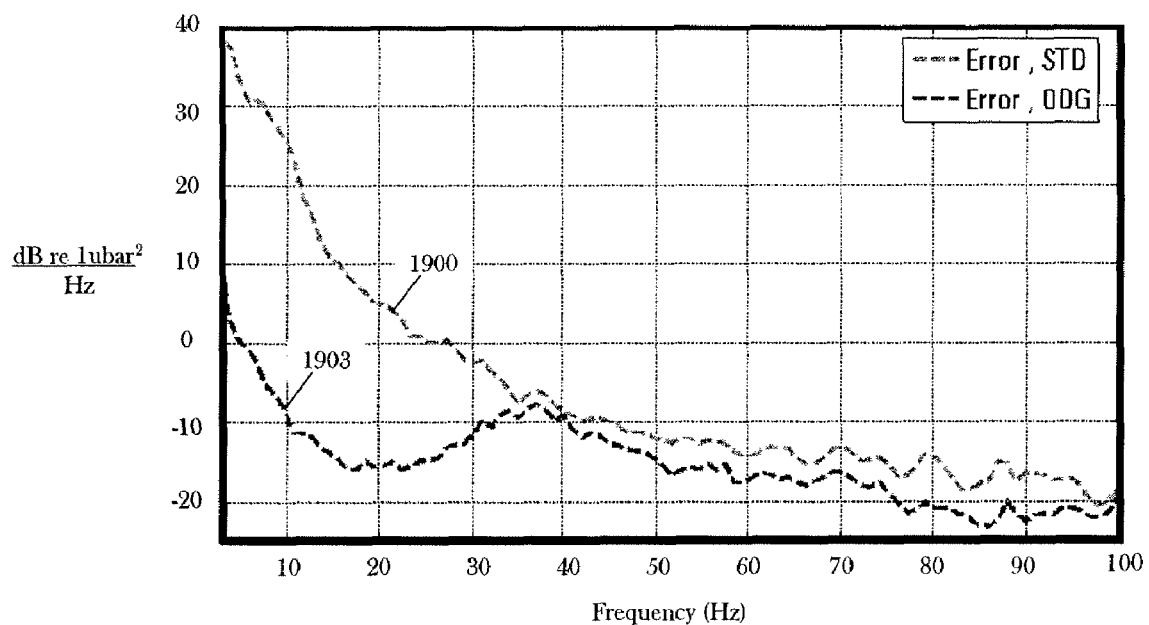
FIG. 19 compares the error in decomposing the synthetic recorded wave field using a standard technique and the method of the present invention.

FIG. 19 shows the estimation error levels on up-going component estimates of the standard and optimal de-ghosting methods 1900, 1903, respectively. In this particular example, the noise level in standard method is dominated by low frequency noise from particle velocity measurement below 30 Hz. The noise level corresponding to optimal method is consistently below noise level corresponding to standard method at all frequencies. In the standard method, up-going wave field is estimated by summing pressure and vertical particle velocity measurements:

$$\hat{P}_{up,STD}(f, k_x, k_y) = 0.5P(f, k_x, k_y) + 0.5V_z(f, k_x, k_y) \quad (26)$$
$$= P_u(f, k_x, k_y) + 0.5N_P(f, k_x, k_y) +$$
$$0.5N_z(f, k_x, k_y)$$

The noise variance in standard method is $0.25s_p^2(f,k_x,k_y) + 0.25s_z^2(f,k_x,k_y)$ and is dominated by low frequency noise from particle velocity measurement below 30 Hz. The noise level corresponding to optimal method is consistently below noise level corresponding to standard method at all frequencies.

Figure 20:
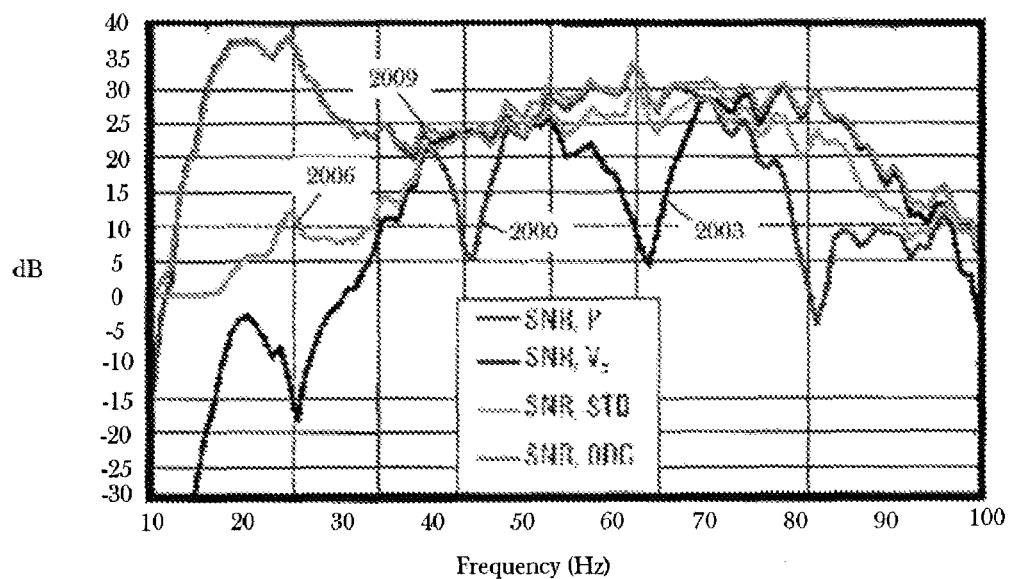
FIG. 20 compares the signal-to-noise ratios of the pressure and vertical displacement of the synthetic recorded wave field, the up-going component determined using a standard decomposition technique, and the up-going component determined using the method of the invention.

FIG. 20 shows the signal-to-noise ratios for pressure only data 2000, vertical particle velocity only data 2003, and estimates by standard method 2006, and optimal de-ghosting methods 2009. Note that the optimal deghosting method 2009 is the sum of the pressure only data and vertical particle velocity measurement curves 2000, 2003. Note also that, the SNR corresponding to the estimate by ODG is much better than the one given by standard method, and the SNR corresponding to the estimate by ODG is never worse than SNR of individual measurements.

Figure 21A:
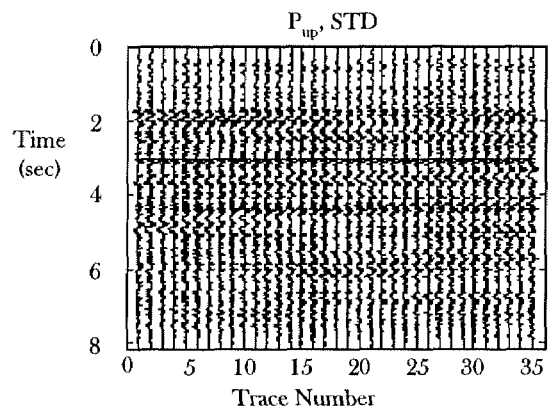
FIG. 21A-FIG. 21B and FIG. 22A-FIG. 22B are wiggle plots illustrating the different in the error in the estimated up-going component between a standard decomposition technique and the method of the present invention.
Figure 21B:
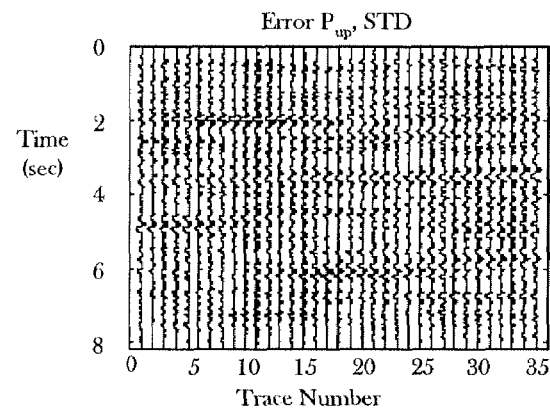
Figure 22A:
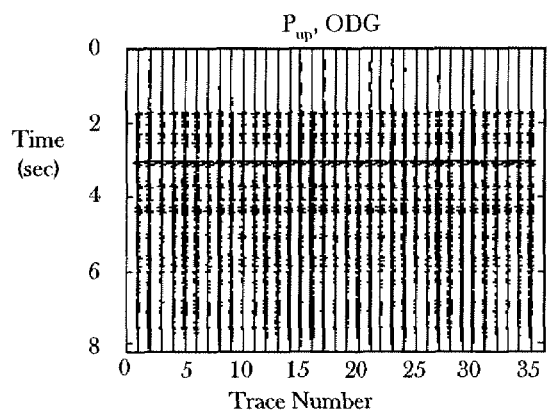
Figure 22B:
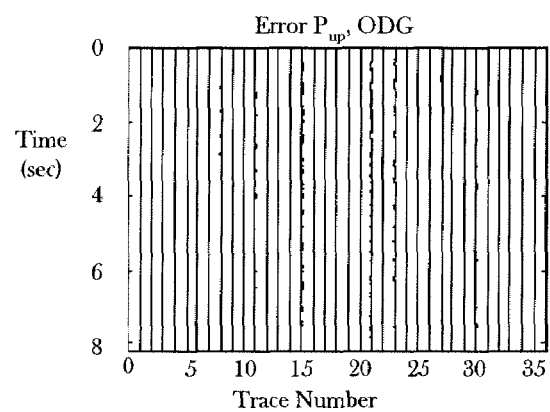

FIG. 21A, FIG. 21B, FIG. 21A, and FIG. 21B show the wiggle plots of up-going pressure measurement estimates and corresponding estimation errors for standard method and optimal de-ghosting method. Optimal method provides a very good estimate of the true up-going wave field.

In any case, in this particular implementation, the technique estimates the noise levels in different measurements and their correlation. It then finds the "optimal" estimate of the up-going wave field which minimizes the fit error between the actual measurement and estimated measurement calculated by using the physical propagation model. The "optimal" solution uses all measurements, and the contribution of each measurement to the model is a function of correlations between different measurements and the physical propagation model.

As was mentioned above, depending on the set of available data, the present invention can be applied to 1-D, 2-D or 3-D wave field separation problems. For example, one can approximate the full 3D solution with 2D data by, e.g., using a 0 cross-line wave number approximation to work in f-kx (the "frequency-wavenumber") domain. Or, one can approximate the full 3D solution with 1D data by, e.g., using a vertical incidence approximation to work in the frequency domain.

Once the directional components have been estimated, the estimates can be used in all manner of ways in further processing of the seismic data. One valued use would be for "deghosting" marine seismic data. For example, in FIG. 3, the downgoing component 325 is a "ghost signal" such as is discussed above. Its effects may therefore be pernicious in some circumstances. To eliminate these effects, the seismic data can be deghosted by subtracting the downgoing component 325 estimated by the method 100 in FIG. 1 from the recorded wavefield 325. Note also that, as discussed immediately above, a 3D solution can be approximated by less the 3D data. Thus, one can therefore use the present invention, for example, deghost marine multicomponent seismic data by using only pressure and vertical (Z) component of the particle velocity.

Note also that one does not need to estimate the noise in detail, only its statistics such as correlations.

This concludes the detailed description. The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the invention. Accordingly, the protection sought herein is as set forth in the claims below.

We claim:

1. A computer-implemented method, comprising:
    estimating the statistics of the noise terms in each one of a predetermined group of seismic measurements in a seismic data set acquired in a marine survey;
    modeling the physical propagation of a recorded wave field represented in the seismic data set from the estimated statistics; and estimating a directional component of the recorded wave field from the physical propagation model that minimizes error relative to the seismic measurements.

2. The computer-implemented method of claim 1, wherein the directional component is an upgoing component.

3. The computer-implemented method of claim 1, wherein the directional component is a downgoing component.

4. The computer-implemented method of claim 1, wherein the estimated statistics include estimated correlations.

5. The computer-implemented method of claim 1, wherein the seismic measurements include pressure and particle displacement.

6. The computer-implemented method of claim 1, wherein the seismic measurements include pressure measurements at at least two different depths.

7. The computer-implemented method of claim 1, wherein estimating the statistics of the noise terms includes estimating second order statistics of noise terms on different measurements.

8. The computer-implemented method of claim 7, wherein the second order statistics include correlations and covariances.

9. The computer-implemented method of claim 7, wherein the second order statistics comprise a rough estimate of the statistics of the noise terms.

10. The computer-implemented method of claim 1, wherein the contribution of each measurement to the model is a function of correlations between different measurements and the physical propagation model.

11. The computer-implemented method of claim 1, further comprising estimating a further wave field quantity.

12. The computer-implemented method of claim 11, wherein the further wave field quantity comprises a propagation characteristic.

13. The computer-implemented method of claim 11, wherein the further wave field quantity comprises downgoing pressure, up-going particle displacement and downgoing particle displacement.

14. The computer-implemented method of claim 1, wherein the group of seismic measurements comprises a subset of a larger group of seismic measurements.

15. The computer-implemented method of claim 14, wherein estimating the directional component includes approximating a full three-dimensional solution with two-dimensional data.

16. The computer-implemented method of claim 15, wherein estimating the directional component includes performing a zero crossline wavenumber approximation.

17. The computer-implemented method of claim 16, wherein the two-dimensional data comprises frequency and wavenumber.

18. The computer-implemented method of claim 14, wherein estimating the directional component includes approximating a full three-dimensional solution with one-dimensional data.

19. The computer-implemented method of claim 18, wherein the one-dimensional data comprises frequency.

20. A computing apparatus, comprising:
a processor;
a bus system;
a storage communicating with the processor over the bus system; and
an application residing on the storage that, when executed by the processor, performs a method, comprising:
estimating the statistics of the noise terms in each one of a predetermined group of seismic measurements in a seismic data set acquired in a marine survey;
modeling the physical propagation of a recorded wave field represented in the seismic data set from the estimated statistics; and
estimating a directional component of the recorded wave field from the physical propagation model that minimizes error relative to the seismic measurements.

21. The computing apparatus of claim 20, wherein the estimated statistics include estimated correlations.

22. The computing apparatus of claim 20, wherein estimating the statistics of the noise terms in the method includes estimating second order statistics of noise terms on different measurements.

23. The computing apparatus of claim 20, wherein the contribution of each measurement to the model is a function of correlations between different measurements and the physical propagation model.

24. The computing apparatus of claim 20, wherein the group of seismic measurements comprises a subset of a larger group of seismic measurements.

25. The computing apparatus of claim 20, wherein the seismic data set resides on the storage.

26. A computer-implemented method, comprising:
modeling the physical propagation of a recorded wave field represented in a seismic data set acquired in a marine survey; and
determining an optimal estimation of a directional component of the recorded wave field from the physical propagation model.

27. The computer-implemented method of claim 26, wherein determining the optimal estimation includes:
estimating the statistics of the noise terms in each one of a predetermined group of seismic measurements in a seismic data set acquired in a marine survey;
modeling the physical propagation of a recorded wave field represented in the seismic data set from the estimated statistics; and
estimating a directional component of the recorded wave field from the physical propagation model that minimizes error relative to the seismic measurements.

28. The computer-implemented method of claim 27, wherein the estimated statistics include estimated correlations.

29. The computer-implemented method of claim 27, wherein estimating the statistics of the noise terms includes estimating second order statistics of noise terms on different measurements.

30. The computer-implemented method of claim 27, wherein the contribution of each measurement to the model is a function of correlations between different measurements and the physical propagation model.

31. The computer-implemented method of claim 27, wherein estimating the directional component includes approximating a full three-dimensional solution with two-dimensional data or with one-dimensional data.

32. A computer-implemented method, comprising:
modeling the physical propagation of a recorded wave field represented in a seismic data set acquired in a towed-array marine survey, the model being derived from each one of a predetermined group of seismic measurements in the seismic data set; and
identifying an estimation of a directional component of the recorded wave field from the physical propagation model that minimizes the fit error between the seismic measurements and the estimate derived from the seismic measurements.

33. The computer-implemented method of claim 32, wherein identifying the estimation includes:

estimating the statistics of the noise terms in each one of a predetermined group of seismic measurements in a seismic data set acquired in a marine survey;

modeling the physical propagation of a recorded wave field represented in the seismic data set from the estimated statistics; and estimating a directional component of the recorded wave field from the physical propagation model that minimizes error relative to the seismic measurements.

34. The computer-implemented method of claim 33, wherein estimating the statistics of the noise terms includes estimating second order statistics of noise terms on different measurements.

35. The computer-implemented method of claim 33, wherein the contribution of each measurement to the model is a function of correlations between different measurements and the physical propagation model.

36. The computer-implemented method of claim 33, wherein estimating the directional component includes approximating a full three-dimensional solution with two-dimensional data or with one-dimensional data.

37. A computer-implemented method, comprising:
identifying a downgoing component of a recorded wavefield represented by a set of seismic data set acquired in a marine survey, including:
estimating the statistics of the noise terms in each one of a predetermined group of seismic measurements in the seismic data;
modeling the physical propagation of the recorded wave field from the estimated statistics; and
estimating the downgoing component from the physical propagation model that minimizes error relative to the seismic measurements; and
deghosting the seismic data using the estimated downgoing component.

38. The computer-implemented method of claim 37, wherein estimating the statistics of the noise terms includes estimating second order statistics of noise terms on different measurements.

39. The computer-implemented method of claim 37, wherein the contribution of each measurement to the model is a function of correlations between different measurements and the physical propagation model.

40. The computer-implemented method of claim 37, wherein estimating the directional component includes approximating a full three-dimensional solution with two-dimensional data or with one-dimensional data.

* * * * *